United States Patent
Mian et al.

(10) Patent No.: US 11,448,562 B2
(45) Date of Patent: Sep. 20, 2022

(54) MECHANICAL COMPONENT TORQUE MEASUREMENT

(71) Applicant: International Electronic Machines Corp., Troy, NY (US)

(72) Inventors: Zahid F. Mian, Loudonville, NY (US); Bruce McKenney, Selkirk, NY (US); Peter Hayes, Constableville, NY (US); Marc Pearlman, Clifton Park, NY (US)

(73) Assignee: International Electronic Machines Corp., Troy, NY (US)

( * ) Notice: Subject to any disclaimer, the term of this patent is extended or adjusted under 35 U.S.C. 154(b) by 112 days.

(21) Appl. No.: 16/952,196

(22) Filed: Nov. 19, 2020

(65) Prior Publication Data

US 2021/0148772 A1    May 20, 2021

Related U.S. Application Data

(60) Provisional application No. 62/937,561, filed on Nov. 19, 2019.

(51) Int. Cl.
*G01L 3/10* (2006.01)

(52) U.S. Cl.
CPC ................... *G01L 3/105* (2013.01)

(58) Field of Classification Search
CPC .................................................. G01L 3/105
USPC ..................... 73/862.331–862.338
See application file for complete search history.

(56) References Cited

U.S. PATENT DOCUMENTS

| | | | | |
|---|---|---|---|---|
| 4,649,758 A | * | 3/1987 | Harbour | G01L 3/105 |
| | | | | 73/862.339 |
| 6,341,534 B1 | * | 1/2002 | Dombrowski | G01L 3/105 |
| | | | | 73/DIG. 2 |
| 7,478,567 B2 | * | 1/2009 | Varonis | G01L 3/102 |
| | | | | 73/862.333 |
| 8,079,274 B2 | | 12/2011 | Mian et al. | |
| 10,866,152 B2 | * | 12/2020 | Hammerschmidt | G01L 3/00 |

FOREIGN PATENT DOCUMENTS

JP             06235668         *  8/1994

* cited by examiner

*Primary Examiner* — Octavia Davis Hollington
(74) *Attorney, Agent, or Firm* — LaBatt, LLC

(57) ABSTRACT

A solution for measuring torque and other parameters of a mechanical component is provided. At least two bands can be affixed to the mechanical component and at least two sensing assemblies can be operatively coupled to each band. Each sensing assembly generates signals indicative of relative movement between a respective band and the sensing assembly. A signal conditioner conditions the signals for a computing unit to determine the torque to the mechanical component. The computing unit can determine the torque from a twist of the mechanical component that can be correlated with the torque.

20 Claims, 12 Drawing Sheets

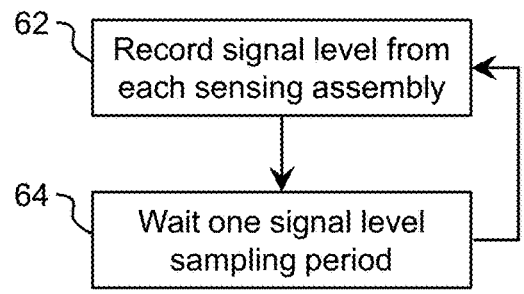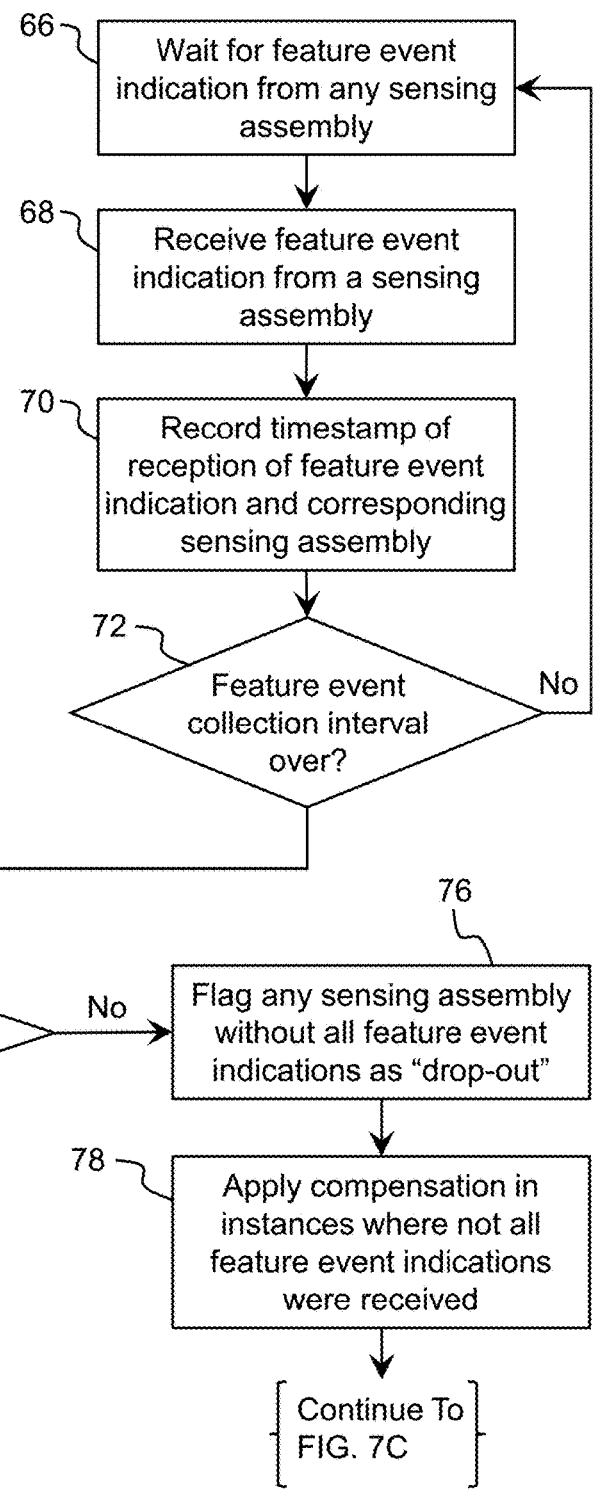

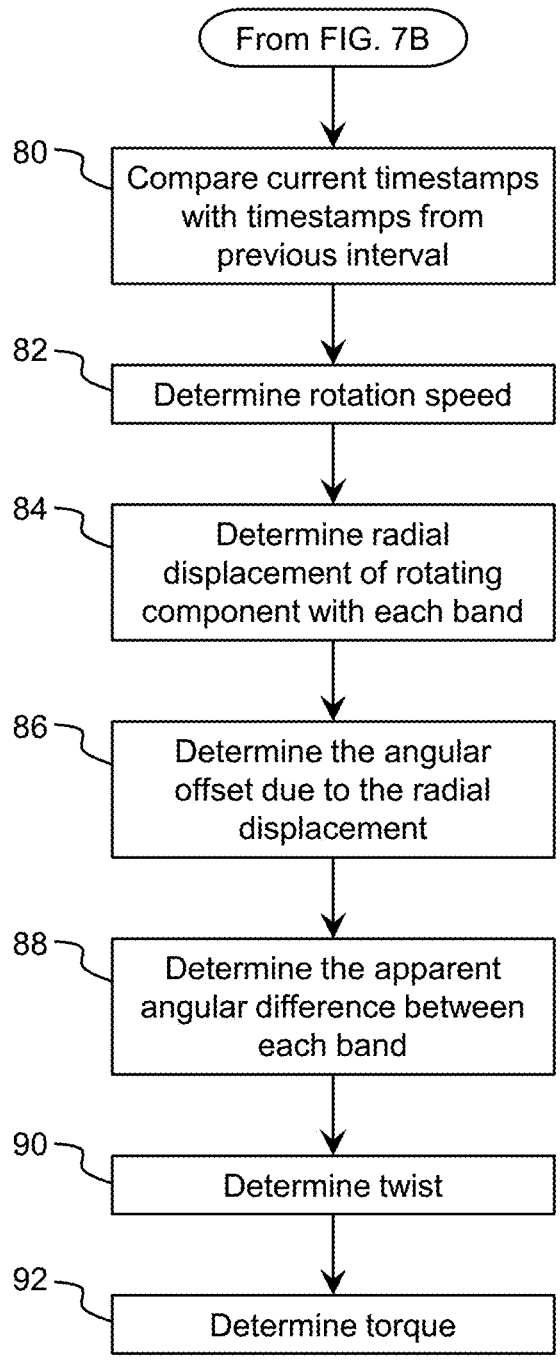

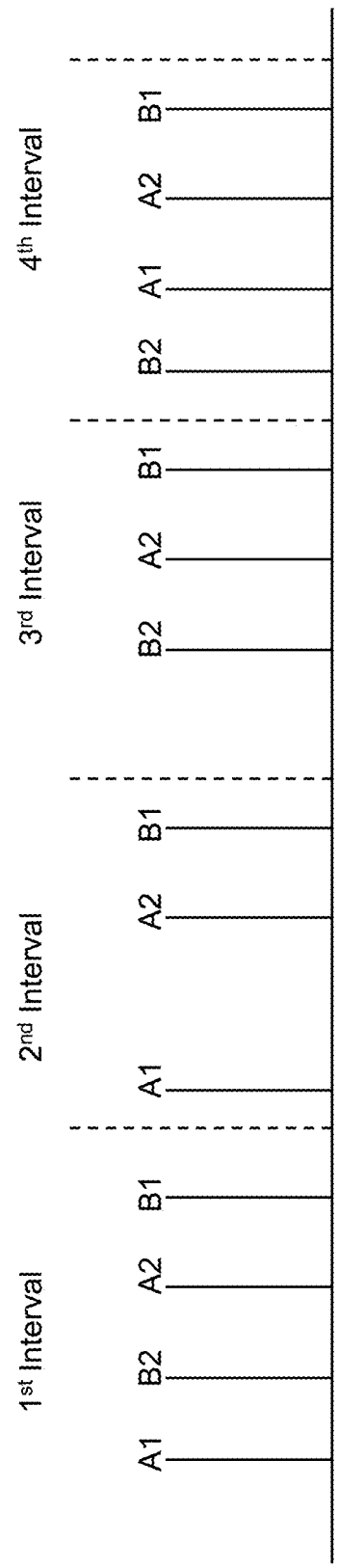

MECHANICAL COMPONENT TORQUE MEASUREMENT

REFERENCE TO RELATED APPLICATIONS

The present patent application claims the benefit of U.S. Provisional Application No. 62/937,561, which was filed on 19 Nov. 2019, and which is hereby incorporated by reference.

TECHNICAL FIELD

The disclosure relates generally to mechanical components, such as rotating components, used in machines, and more particularly, to measuring torque and other parameters of the mechanical components without the measuring devices having physical connections to the mechanical components or requiring direct modifications of the mechanical components.

BACKGROUND ART

Measurement of torque and other related parameters are useful capabilities in a number of transportation and industrial applications. For example, measuring the torque or strain on a mechanical element such as a rotating component (e.g., a drive shaft) can be used in Health and Usage Monitoring Systems (HUMS) to determine the use of the component and the available or expected lifetime of the component. Additionally, the measurement of torque in real-time enables the HUMS to warn when the rotating component is approaching a limit of operation.

There are many approaches for measuring and monitoring torque, from the simple to the more complex, and under less arduous applications they can all provide reliable results. For example, basic methods of measuring and monitoring torque typically center around the use of strain gage elements with required power supply/signal connections and strategic placement of the strain gage elements on a targeted member or serially loaded component elements associated with the member. Although useful in many instances, there are inherent limitations and application challenges associated with the use of strain gauges. For instance, use of traditional strain gages requires surface preparation and adherence methods that can sometimes alter or constrain the gages or their assembled version. In addition, these strain gages tend to be fragile devices that can be over-stressed with a hysteresis affect causing a permanent shift to the strain gage characteristics. This can affect calibration values of the strain gauges or can result in complete device failure.

Measuring and monitoring torque of mechanical elements that include rotating components present further challenges due to the rotational motion associated with the rotating components, which can include axial and non-concentric radial movement of the components relative to surrounding housings and sensor assemblies. For example, obtaining torque measurements from a rotating component often entails successful coupling of power from the torque measuring instrumentation to the targeted rotating component and retrieval of signal data generated on the component, all while not adversely altering its functional use. The use of slip rings is one of the early principal approaches deployed to couple torque measuring instrumentation to targeted rotating components. However, slip rings are susceptible to vibration, contact wear, contamination and heat generation from contact friction with the rotating components.

A wireless variant of slip rings addressed some of the vulnerability issues associated with such devices by utilizing inductive coupling of power and signals from the rotating component (e.g., the inductive coupling of power and signals from a housing to a drive shaft). However, these wireless variants still share some of the burdens of the closely related slip rings. Some of these burdens include a physical limitation to tolerated movement of the monitored rotating components to surrounding housing/coupling mechanics of the wireless slip ring/sensor pickup assemblies, and the use of bearings to support the assemblies around the rotating components (e.g., shaft-like elements) that are substituted for a length of the monitored components. Further, these wireless variants of slip rings can have a large space allocation requirement and can add to frictional losses along with rotational speed limit specifications that can constrain their application.

Another approach to measuring and monitoring torque involves using optical type sensor systems. Typically, optical type sensor systems do not necessitate modifications to the rotating components in order to be operational. However, these systems tend to be expensive and not tolerant to optical contamination that can arise from many possible sources in their normal operating environment. For example, dust particles and dirt may obscure the markings, objects, or emitters used by the optical sensors. The dust particles and dirt can also cover and/or degrade the performance of the sensing elements themselves. Further, optical type sensor systems are not well suited for use in locations where oils or other commonplace contaminants are present, as these items obscure the optical performance.

Another approach to measuring and monitoring torque involves utilizing non-contact magnetic field measurement. One example of non-contact magnetic field measurement relies on the use of magnetic signature modeling to measure torque. However, this approach requires substitution of prime components with parts constructed of exotic materials and extensive instrumentation. Further drawbacks to using magnetic signature modeling to measure torque are that this approach typically involves new processes, significant engineering time for design and calculations, potential certification issues, and practical use limitations of material characteristics to perform the intended task of measuring and monitoring torque in a rotating component. These issues become even more significant when the rotating component is part of an established system and manufacturing process. For example, consider a widely-used vehicle such as an automobile. Any change to an established design of components of the vehicle impacts the physical manufacturing and also the vehicle safety and certification areas of the car industry.

Other non-contact magnetic field measurement approaches to ascertaining torque in rotating components have common challenges. For example, most methods for non-contact magnetic field measurements tend to be limited by very small "lift-off" levels (i.e., small fractions of an inch). In many cases, in order to be properly instrumented, a rotating component such as a shaft, may require one quarter of an inch or greater clearance due to its movement while in use. This amount is typically much greater than the practical ranges for many magnetic field measurement-based devices.

SUMMARY OF THE INVENTION

This summary of the invention introduces a selection of certain concepts in a brief form that are further described below in the detailed description. It is not intended to exclusively identify key features or essential features of the claimed subject matter set forth in the claims, nor is it intended as an aid in determining the scope of the claimed subject matter.

Aspects of the present invention are directed to a solution for addressing one or more of the limitations associated with the previously described approaches to measuring and monitoring torque in a mechanical component, such as a rotating component. To this extent, embodiments of the present invention are directed to a new and innovative approach to measuring and monitoring torque of a rotating component. Other related parameters of the rotating component, such as for example, strain (e.g., twist), rotational speed, rotational displacement, spatial displacement, etc., also can be measured and monitored. The embodiments require neither physical connections to the measured rotating component nor direct modifications of the rotating component, and are not limited to very small lift-off levels. Furthermore, the embodiments can utilize a robust characterization method to measure and monitor torque and related parameters of a rotating component that is tolerant to relative movement, and has minimum interference clearance that can be attached to high speed rotating parts with negligible impact to dynamic balance of the rotating parts.

In addition, the approach afforded by the embodiments is wireless and enables accurate acquisition of data with no moving components except for the rotating component itself. Furthermore, the embodiments of the present invention have applicability beyond rotating components. In particular, the embodiments are suited for use with any mechanical components that can become stressed and move during intervals of operation, and where it is desirable to measure and monitor torque of these components for performance, structural and safety reasons.

A first aspect of the invention provides a system for measuring torque of a mechanical component, comprising: at least two bands affixed to the mechanical component; at least two sensing assemblies operatively coupled to each band, each sensing assembly configured to generate signals indicative of relative movement between a respective band and the sensing assembly; a signal conditioner to condition the signals; and a computing unit to determine a torque applied to the mechanical component based on the conditioned signals, wherein the computing unit is configured to determine the torque by: determining a radial displacement of the mechanical component with the bands based on strength and phase differences of the signals obtained by the respective sensing assemblies operatively coupled to the bands; determining an angular offset of the bands with the rotating component due to the radial displacement; determining an apparent angular phase difference between the bands based on differences in the signals generated from respective sensing assemblies; determining the amount of twist of the mechanical component that is present while the mechanical component is experiencing torque as a function of the apparent angular phase difference, the angular offset, and a predetermined angular phase difference between the bands obtained under a known torque condition; and correlating the amount of twist with the torque applied to the mechanical component.

A second aspect of the invention provides a system for measuring torque of a rotating component, comprising: at least two bands affixed to the rotating component with a predetermining spacing separating the bands; at least two sensing assemblies operatively coupled to each band, each sensing assembly configured to generate signals that are indicative of a change in magnetic flux due to relative movement between a respective band and the sensing assembly; a signal conditioner with a pre-processing component to condition and pre-process the signals generated by the sensing assemblies; a computing unit to determine the torque applied to the rotating component based on the conditioned and pre-processed signals, wherein the computing unit is configured to determine the torque by: determining a radial displacement of an axis of rotation of the rotating component with the bands based on a strength and phase differences of the signals obtained by the respective sensing assemblies operatively coupled to the bands; determining an angular offset of the bands with the axis of rotation of the rotating component due to the radial displacement; determining an apparent angular phase difference between the bands based on differences in the signals generated from respective sensing coils assemblies; determining an amount of twist as a function of the apparent angular phase difference, the angular offset, and a predetermined angular phase difference between the magnetic bands obtained under a known torque condition; and correlating the amount of twist with the torque applied to the rotating component.

A third aspect of the invention provides a system for measuring torque of a rotating component, comprising: at least two bands affixed to the rotating component; at least two sensing assemblies operatively coupled to each band, each sensing assembly configured to generate signals indicative of movement of a respective band operatively coupled to the sensing assembly; a signal conditioner to condition the signals, wherein the signal conditioner is configured to filter the signals, and identify feature events in the filtered signals; and a computing unit configured to determine the torque applied to the rotating component by: identifying feature events in the filtered signals associated with each sensing assembly; recording a feature event timestamp in response to the identification of each feature event; determining a radial displacement of the rotating component with the bands based on timing differences of the feature events identified for the respective sensing assemblies operatively coupled to the bands; determining an angular offset of the bands with the rotating component due to the radial displacement; determining an apparent angular phase difference between the bands based on differences in the signals generated from respective sensing assemblies; determining the amount of twist as a function of the apparent angular phase difference, the angular offset, and a predetermined angular phase difference between the bands obtained under a known torque condition; and correlating the amount of twist with the torque applied to the rotating component.

A fourth aspect of the invention provides a system for monitoring torque of a rotating component, comprising: at least two bands affixed to the rotating component; at least two sensing assemblies operatively coupled to each band, each sensing assembly configured to generate signals indicative of movement of a respective band operatively coupled to the sensing assembly; a signal conditioner to condition the signals; a computing unit to determine the torque applied to the rotating component based on the conditioned signals, wherein the computing unit is configured to determine the torque from an amount of twist of the rotating component that is induced by the torque, wherein the computing unit determines a radial displacement of the axis of rotation of the rotating component with the bands based on a strength and phase differences of the signals obtained by the respective sensing assemblies operatively coupled to the bands, wherein the computing unit determines an angular offset of the bands with the axis of rotation of the rotating component due to the radial displacement, wherein the computing unit determines an apparent angular phase difference between the bands based on differences in the signals generated from respective sensing assemblies, and wherein the computing unit is configured to determine the amount of twist as a function of the apparent angular phase difference, the angular offset, and a predetermined angular phase difference between the bands obtained under a known torque condition; and a data acquisition unit operatively coupled to the computing unit, wherein the data acquisition unit is configured to monitor the torque and the twist determined by the computing unit and determine an effect that the torque and the twist has on the rotating component.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 6A shows a more detailed schematic block diagram view of the signal conditioner depicted in FIG. 1, while

FIGS. 7A-7C are flow charts describing operations associated with an algorithm that can be implemented in the computing unit depicted in FIG. 1 that determines the torque applied to a rotating component according to an embodiment.

FIG. 8 is a graphical example illustrating the processing of detected feature event signals in feature event collection intervals depicted in FIG. 7B according to embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
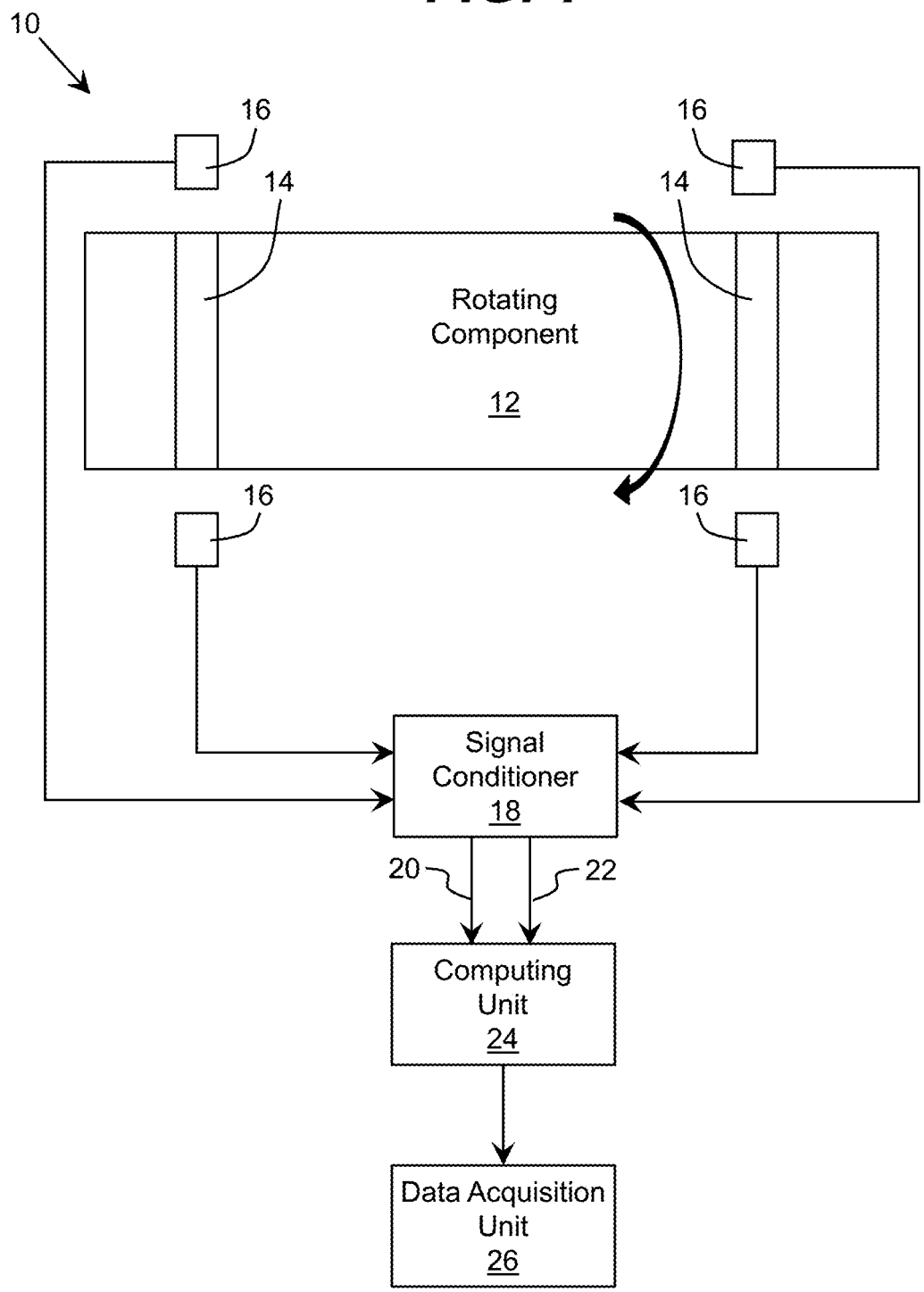
FIG. 1 shows a schematic block diagram of a system to measure and monitor torque of a rotating component according to an embodiment.

As indicated above, aspects of the invention are directed to approaches that can measure and monitor torque in a mechanical component, such as a rotating component. These approaches do not involve physical connections and direct modifications to the rotating component for the data acquisition components. Further, these aspects are not limited to very small lift-off levels, but instead can allow for significant lift-off (i.e., greater than one quarter inch). In addition to measuring torque in a rotating component, aspects of the invention are also directed to determining other related parameters such as for example, strain (e.g., twist), rotational speed, rotational displacement and spatial displacement. To this extent, other aspects of the invention are directed to monitoring these measurements and determining how such measurements affect the performance of the rotating component, as well as the impact that the measurements have on the component from structural and/or safety point of views.

Although the description that follows is directed to determining torque of a rotating component such as a rotating shaft or axle, it is understood that the various embodiments are suitable for use with other types of rotating components and/or measurements. For example, other rotating components that are suited for use with the various embodiments include, but are not limited to, drill bits, augers, wheels, gears, belts, etc. In addition, it is understood that the various embodiments have applicability for mechanical components beyond rotating components. In particular, the various embodiments are suited for use with any mechanical component that can become stressed and/or move during intervals of operation, and where it is desirable to measure and monitor one or more aspects of the rotation or other type of movement, such as the torque, of the mechanical component for reasons that can include performance, structural, safety, etc. Examples of other mechanical components that have applicability with the embodiments described herein include, but are not limited to, various components undergoing lateral motion, such as vibration, rectilinear motion, a non-rotating shaft (e.g., using magnetometers, such as Hall effect or magnetoresistive sensors), and/or the like.

The description that follows may use other terminology herein for the purpose of only describing particular embodiments and is not intended to be limiting of the disclosure. For example, unless otherwise noted, the term "set" means one or more (i.e., at least one) and the phrase "any solution" means any now known or later developed solution. The singular forms "a," "an," and "the" include the plural forms as well, unless the context clearly indicates otherwise. It is further understood that the terms "comprises," "comprising," "includes," "including," "has," "have," and "having" when used in this specification, specify the presence of stated features, integers, steps, operations, elements, and/or components, but do not preclude the presence or addition of one or more other features, integers, steps, operations, elements, components, and/or groups thereof. Additionally, spatially relative terms, such as "on," "below," "above," etc., may be used in reference to the orientation shown in the drawings. It is understood that embodiments of the invention are not limited to any particular orientation of a device described herein. Also, the use of a phrase of the form "at least one of A, B, C . . . or n" to delineate a listing of two or more possible parameters, components, characteristics, factors, etc., means any combination of one or more of A, B, C, n. For example, at least one of A or B means only A, only B, or both A and B.

The description may also list values of parameters of elements, components, objects, materials, layers, structures, and the like, for the purpose of describing further details of particular embodiments. It is understood that, unless otherwise specified, each value is approximate and each range of values included herein is inclusive of the end values defining the range.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

It is understood that the use of specific component, device and/or parameter names are for example only, and not meant to imply any limitations on the various embodiments of the invention. The embodiments of the invention may thus be implemented with different nomenclature/terminology utilized to describe the mechanisms/units/structures/components/devices/parameters herein, without limitation. Each term utilized herein is to be given its broadest interpretation given the context in which that term is utilized.

Turning to the drawings, FIG. 1 shows a schematic block diagram of a system 10 to measure and monitor torque of a rotating component 12 according to an embodiment. In one embodiment, the rotating component 12 can include a rotating shaft or axle. At least two bands 14 are affixed to the rotating component 12. The bands can be separated from one another with a predetermined spacing. In one embodiment, as explained below in more detail, the bands 14 can include thin magnet bands installed on the rotating component 12.

The rotating component 12 can have any cross-sectional shape. In an embodiment, at least the regions on which the bands 14 are affixed have an elliptical or circular cross-sectional shape. In this case, the bands 14 can comprise rings, each also having an elliptical or circular cross-sectional shape that substantially conforms to the cross-sectional shape of the rotating component 12. However, it is understood that the bands 14 can have any suitable shape. Such a shape can substantially conform to the shape of the rotating component 12. Alternatively, one or both bands 14 can have a cross-sectional shape that varies from that of the rotating component 12. For example, the rotating component 12 could have a non-elliptical or irregular shape at a location of a band 14, but the band 14 can have an elliptical or circular shape. In such an embodiment, the band's shape must be such that it does not interfere with operation of the rotating component 12 and must be affixed to the rotating component 12 using a solution that does not enable the band 14 to move relative to the rotating component 12.

Each band 14 affixed to the rotating component 12 includes at least two sensing assemblies 16 operatively coupled to the band. In one embodiment, each of the two sensing assemblies 16 operatively coupled to one of the bands 14 can be located on opposing sides of the rotating component 12. Each sensing assembly 16 is configured to generate signals that are indicative of movement of a respective band 14 operatively coupled to the sensing assembly 16 during rotation of the rotating component 12. In one embodiment in which the bands 14 are magnet bands, torque to the rotating component 12 will generate twist, circumferentially displacing one band from the other. This twist can be detected in the sensing assemblies 16 as a shift in the phase of one ring signal with respect to the other.

Each sensing assembly 16 can include one of a number of sensing assemblies that detect movement of the bands. In one embodiment, the sensing assemblies 16 can include sensing coil assemblies. Other sensing assemblies that can be operatively coupled to the bands 14 to detect movement can include, but are not limited to, Hall Effect sensors, magnetoresistive sensors, and/or the like.

As shown in FIG. 1, a signal conditioner 18 can receive the signal outputs from each of the sensing assemblies 16. The signal conditioner 18 can be configured to condition the signal outputs received from the sensing assemblies 16. In one embodiment, the conditioning performed by the signal conditioner 18 includes amplification and/or filtering of each the signal outputs received from the sensing assemblies 16.

The signal conditioner 18 can further include a pre-processing component that pre-processes the signal outputs received from each of the sensing assemblies 16. In one embodiment, the pre-processing component of the signal conditioner 18 can identify feature events in the signal outputs received from each of the sensing assemblies 16 after conditioning. For example, the pre-processing component can identify signal features in the conditioned signals that include, but are not limited to, signal peaks, zero crossings, root mean square (RMS) energy, etc. In one embodiment, as shown in FIG. 1, the signal conditioner 18 can have two sets of output lines 20 and 22 that are representative of the conditioned signal outputs and the identified signal feature event outputs from the sensing assemblies 16. For example, the output lines 20 can represent the conditioned signal outputs (e.g., amplified and filtered signals) from each of the four sensing assemblies 16, while the output lines 22 can represent the identified signal feature event outputs.

A computing unit 24 can receive the conditioned and pre-processed signals from the signal conditioner 18 via the two sets of output lines 20 and 22. The computing unit 24 can determine the torque applied to the rotating component 12 based on the conditioned and pre-processed signals. In one embodiment, the computing unit 24 can correlate the torque with an amount of twist of the rotating component 12, which can be assumed to be induced by the torque. As explained herein, the computing unit 24 can use the signals to determine the amount of twist as a function of several parameters that pertain to the rotating component 12, the bands 14, and the sensing assemblies 16. In particular, the computing unit 24 can determine a radial displacement of the rotating component 12 with the bands 14 based on the strength and phase differences of the signals obtained by the respective sensing assemblies 16 operatively coupled to the bands. In addition, the computing unit 24 can determine an angular offset of the bands 14 with the axis of rotation of the rotating component due to the radial displacement. Also, the computing unit 24 can determine an apparent angular phase difference between the bands 14 based on differences in the signals generated from respective sensing assemblies 16. The computing unit 24 can determine the amount of twist as a function of the apparent angular phase difference, the angular offset, and a predetermined angular phase difference between the bands 14 that is obtained under a known torque condition.

In addition, to determining the torque to the rotating component 12, the computing unit 24 can analyze the conditioned and pre-processed signals from the signal conditioner 18 to ascertain other values. For example, the computing unit 24 can determine other higher order statistics of interest such as, but not limited to, maximum, minimum, standard deviation, etc. It is understood that the computing unit 24 can analyze the conditioned and pre-processed signals to determine other data beyond the torque related parameters and higher order statistics such as, but not limited to, time and/or frequency domain profiles of the signals and other derived values including rotational speed of the rotating component 12, any errors in determining the rotational speed, acceleration, magnet size variation, angular momentum, jerk, rotatum, etc.

As shown in FIG. 1, the system 10 can also include a data acquisition unit 26 operatively coupled to the computing unit 24. The data acquisition unit 26 can be used to perform a number of different functions that include, but are not limited to, logging the data and calculations made by the computing unit 24, visualization of the data and calculations for facilitating qualitative analysis, image analysis including one-dimensional, two-dimensional, three-dimensional, and four-dimensional (e.g., animation) visualizations, and/or performing additional analyses desired for the corresponding implementation.

In one embodiment, the data acquisition unit 26 can be configured to monitor the torque and the twist determined by the computing unit 24 and determine an effect that the torque and the twist have on the rotating component 12. For example, depending on the type of rotating component 12 and the application of the component within a system, a certain amount of torque can be acceptable for operation, but nevertheless, it may be very desirable, if not necessary, to monitor the amount of torque that is experienced by the rotating component 12, as its operation could have an important role in the well-being of the operation of the system. For instance, excessive torque may indicate imminent performance degradation or failure to the rotating component 12 which could adversely affect the overall system operation. Thus, longer-term monitoring of torque by the data acquisition unit 26 can provide valuable insight into the amount of wear and potential effect on the lifetime of the rotating component 12. Monitoring of the torque by the data acquisition unit 26 can also be used to provide information with respect to the performance degradation and failure of the rotating component 12. In this manner, the data acquisition unit 26 can use this monitoring functionality to prescribe maintenance operations including recommended timing for replacing parts, and intervals for performing the maintenance, with the goals of optimizing device performance and safety.

Although the computing unit 24 and the data acquisition unit 26 are depicted in FIG. 1 as separate components, it is understood that these components can be configured in the system 10 in a number of different arrangements without impairing the operation of the system. For example, the computing unit 24 and the data acquisition unit 26 can be configured to operate within a host computing unit operatively coupled in close proximity to the rotating component 12 (e.g., in the same operating space) or located remotely from the location of operation of the rotating component 12.

Figure 2:
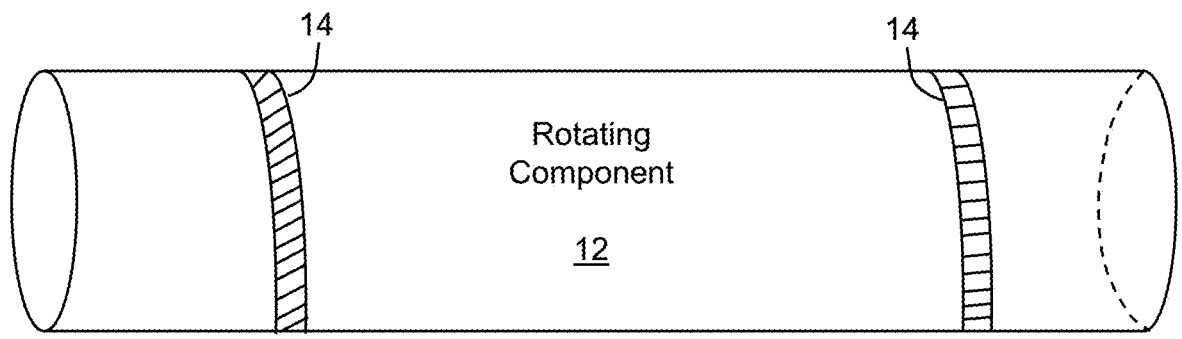
FIG. 2 shows bands affixed to a rotating component that are utilized to obtain measurements from the rotating component according to an embodiment.

FIG. 2 shows a more detailed view of the bands 14 affixed to the rotating component 12 that are depicted in FIG. 1 and utilized to obtain measurements from the rotating component according to an embodiment. As noted above, the bands 14 are separated from one another by a predetermined spacing. It is understood that the distance between the bands 14 that forms the predetermined spacing will typically depend on the specific rotating component 12, the size of the component, the environment of operation and any other systems with/in which the rotating component 12 operates.

In general, each band 14 can be installed on the rotating component 12 using one or more of a number of approaches that prevent the bands 14 from slipping along or around the rotating component 12. In one embodiment, the bands, or portions thereof, can be press fitted to the rotating component 12 and bonded using a high-strength retaining compound for close-fitting parts. This ensures that the bands do not slip along or around the rotating component 12. Other approaches can include, but are not limited to, match machining, adhesives, mechanical fasteners, and/or the like. Additionally, the bands 14 can be located on the rotating component 12 with a separation spacing that is as far away from each other as practicable. Maximizing the separation distance of the bands 14 in this manner can typically result in improved accuracy of the torque calculations by the computing unit 24.

Figure 3:
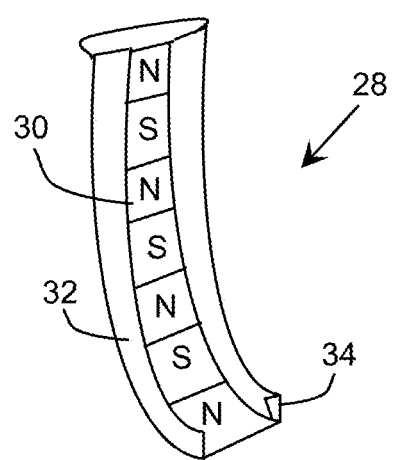
FIG. 3 shows a partial cutaway view of a magnetic band assembly that can be affixed to a rotating component that includes magnetic segments arranged with an alternating north and south pole pattern according to an embodiment.

As noted above, the bands 14 can include thin magnet bands installed on the rotating component 12. In one embodiment, each of the magnetic bands can include a plurality of magnetic segments that are securely affixed to an inner perimeter of the bands. To this extent, FIG. 3 shows a partial cutaway view of a magnetic band assembly 28 with magnetic segments 30 that can be affixed to a rotating component. As shown in FIG. 3, the magnetic segments 30 can be affixed to an inner perimeter 32 of the magnetic band assembly 28 and arranged with an alternating north (N) and south (S) pole pattern. In this example, each of the individual magnet segments are used to make abrupt transitions between north and south poles, with the north and south poles facing toward the band's center.

In one embodiment, the magnetic segments 30 can include an even number of segments. Furthermore, an embodiment comprises magnetic segments 30 that have substantially the same size. Such configurations can provide a magnetic band assembly 28 having continuous transitions between the north and south poles for an entire perimeter of the magnetic band assembly 28. However, it is understood that magnetic segments 30 of varying sizes, separation distances, and/or an odd number of magnetic segments 30 can be utilized. In such a situation, attributes of the arrangement of magnetic segments 30 and the corresponding data acquired by the sensing assemblies 16 (FIG. 1) can be determined under a known torque condition so that any unexpected deviations can be determined.

In one embodiment, the magnetic band assembly 28 can include an internal groove 34 that provides an interference fit for the magnetic segments 30 along the inner perimeter 32. It is understood that the internal groove 34 can be independent of the magnetic segments 30. Also, it is understood that other modalities of fastening can be used to affix the magnetic segments 30 along the inner perimeter 32 of the magnetic band assembly 28. For example, the magnetic segments 30 can be affixed along the inner perimeter 32 of the magnetic band assembly 28 by adhering (e.g., gluing) the segments and using an expanding plug to hold the magnetic segments 30 in place while the adhesive is curing. The internal groove 34, which could be optional in this embodiment, can be used as a means to further secure the glued magnetic segments 30 along the inner perimeter 32 of the magnetic band assembly 28.

Instead of using magnetic bands, it is understood that the bands 14 could be magnetized. For example, in one embodiment, a band 14 can include magnetic material segments along the perimeter of the band 14. In one embodiment, each of the magnetic material segments can have a north pole and a south pole, with the north and south poles of the magnetic material segments arranged to form an alternating north pole and south pole pattern along the perimeter of the band 14 as described herein.

Figure 4A:
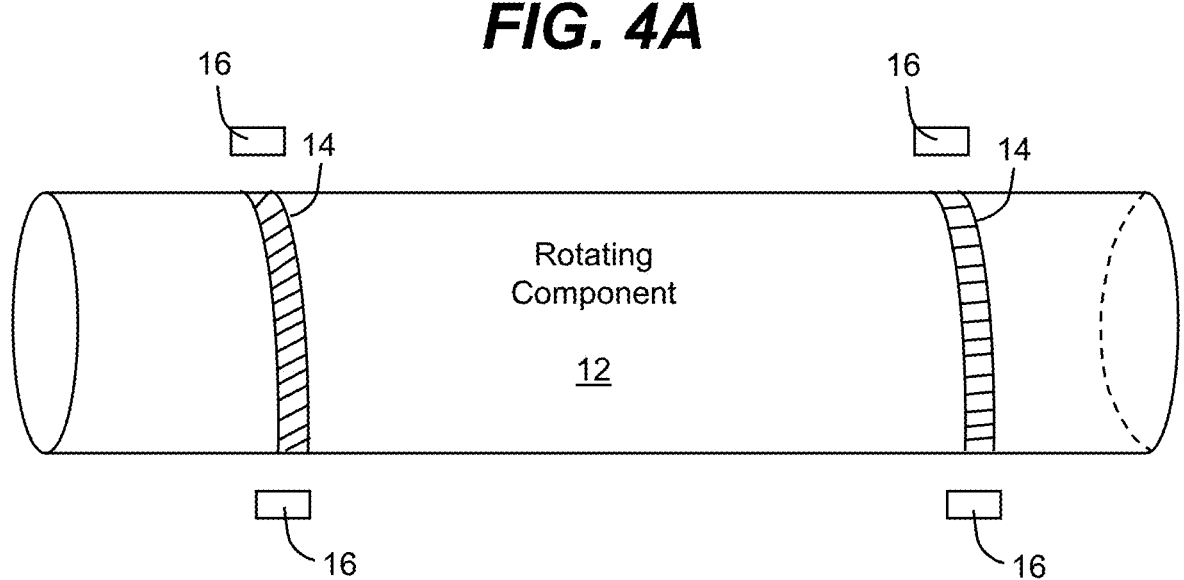
FIG. 4A shows a pair of sensing assemblies in close proximity to a respective band affixed to a rotating component.
Figure 4B:
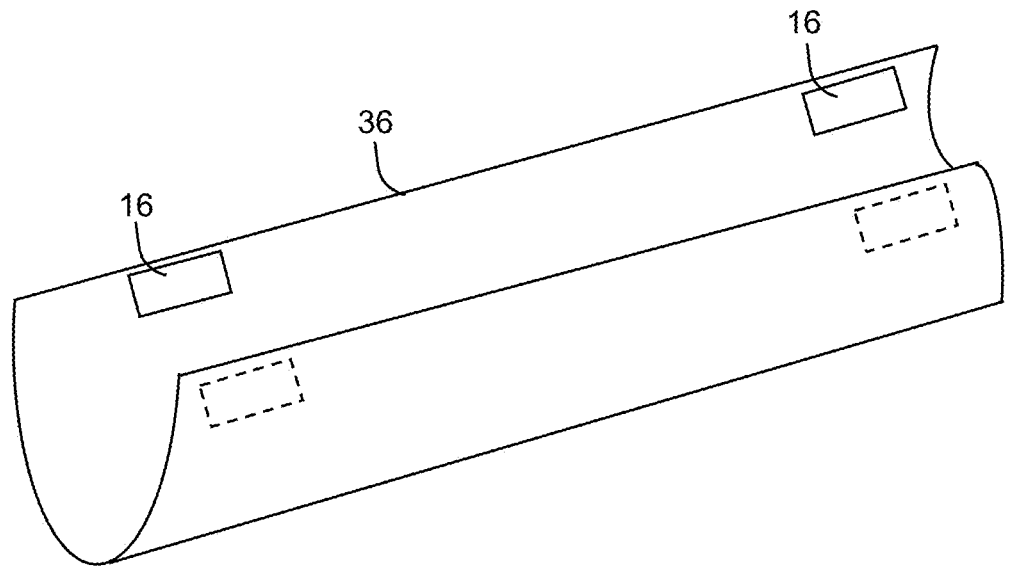
FIG. 4B shows a non-rotating, rigid structure that can partially or wholly surround the rotating component and support the pairs of sensing assemblies according to embodiments.

FIGS. 4A-4B show examples of the physical relationship of the bands 14 and the sensing assemblies 16 with respect to the rotating component 12. In particular, FIG. 4A shows a pair of sensing assemblies 16 in close proximity to a respective band 14 affixed to the rotating component 12, and FIG. 4B shows a rigid structure 36 that can provide a rigid support for the pairs of sensing coil assemblies 16 according to embodiments. The rigid structure 36 can be located in a fixed, non-rotating orientation with respect to the rotating component 12. As illustrated, the rigid structure 36 can partially or wholly surround the rotating component 12.

As shown in FIG. 4A, each pair of sensing assemblies 16 are associated with one of the bands 14 such that each pair of sensing assemblies associated with a respective band are located on opposite sides of the rotating component 12, facing the band 14. The rigid structure 36 shown in FIG. 4B can be a common rigid carrier that supports the mounting or installation of the sensing assemblies 16 thereto. Examples of a rigid structure 36 that are suitable for use in partially or wholly surrounding the rotating component 12 such as a shaft and receiving the sensing assemblies 16 can include, but are not limited to, a sheath, a bulkhead mount, etc.

In embodiments, the rigid structure 36 can comprise existing structure of a system in which the rotating component 12 is operating. Furthermore, the rigid structure 36 can comprise additional support structure added to the system, e.g., mounted to existing structure, which is configured to locate the sensing assemblies 16 in desired positions with respect to the rotating component 12. Nevertheless, it is understood that the sensing assemblies 16 can be secured to the structure 36 in a fixed location relative to each other. If a sensing assembly 16 shifts from its installation position, this can be misconstrued by the system 10 depicted in FIG. 1, and in particular, the computing unit 24, as a radial displacement and/or twist of the rotating component 12. In general, this will adversely impact the torque measurement, with the exception being cases in which all of the sensing assemblies 16 associated with the same band 14 experience identical displacement.

Figure 5A:
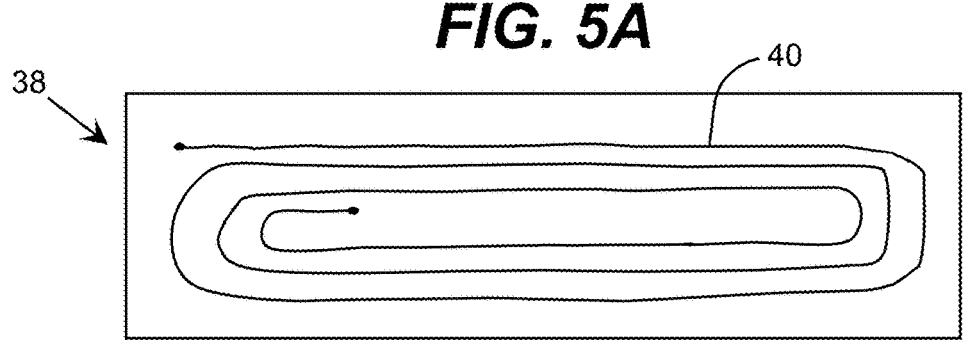
FIGS. 5A-5C shows various views of sensing coil assemblies that can be used according to embodiments.
Figure 5B:
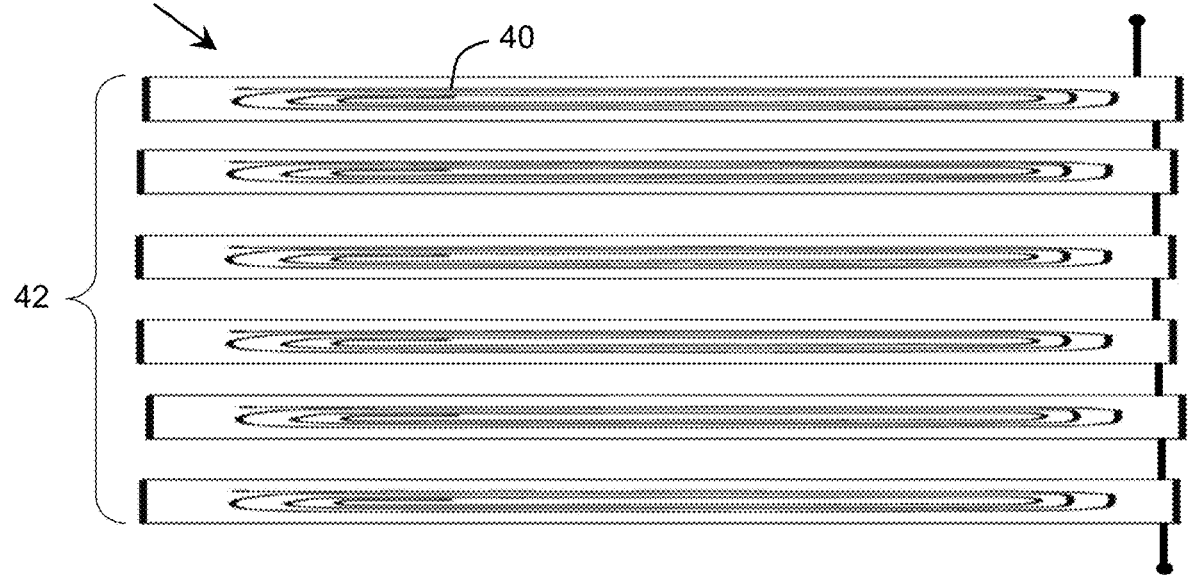
Figure 5C:
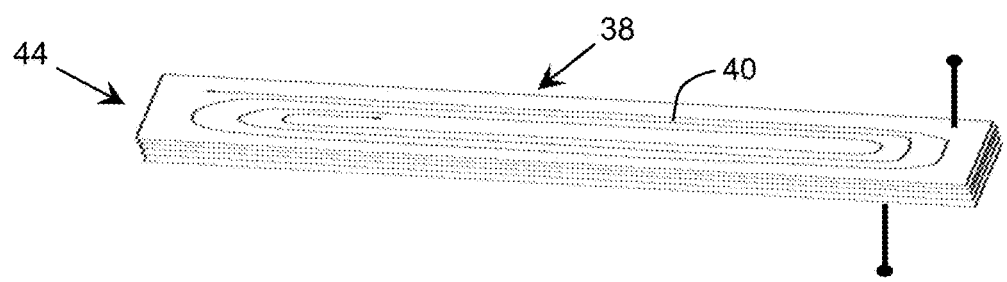

In one embodiment, the sensing assemblies 16 can include sensing coil assemblies. The sensing coil assemblies, which can include electromagnetic coils of any type, are well suited for operation with bands 14 that take the form of magnetic bands as described herein. FIGS. 5A-5C shows various views of sensing coil assemblies 38 that can be used according to embodiments. The base component of the sensing coil assemblies 38 depicted in FIGS. 5A-5C can include a wire trace coil 40. FIG. 5A shows the sensing coil assembly 38 having a single wire trace coil 40, while FIG. 5B shows the sensing coil assembly 38 formed of a multiple of wire trace coils 40 coupled in series 42. FIG. 5C shows the sensing coil assembly 38 containing the multiple of coupled wire trace coils 40 implemented on a multi-layered printed circuit 44 that is suited for installation with the rigid structure 36 depicted in FIG. 4B or the like. The sensing coil assemblies 38 depicted in FIGS. 5A-5C are beneficial in that each increases the signal quality received from its respective band. As a result, the rate of dropouts, which are feature events not recognized by the feature detector, are reduced over a given distance. This increases the allowed clearance (lift-off) with the rotating component 12, and thus, improves the signal quality to allow for more accurate waveform representation and signal feature event timing identification by the signal conditioner 18 (FIG. 1).

Figure 6A:
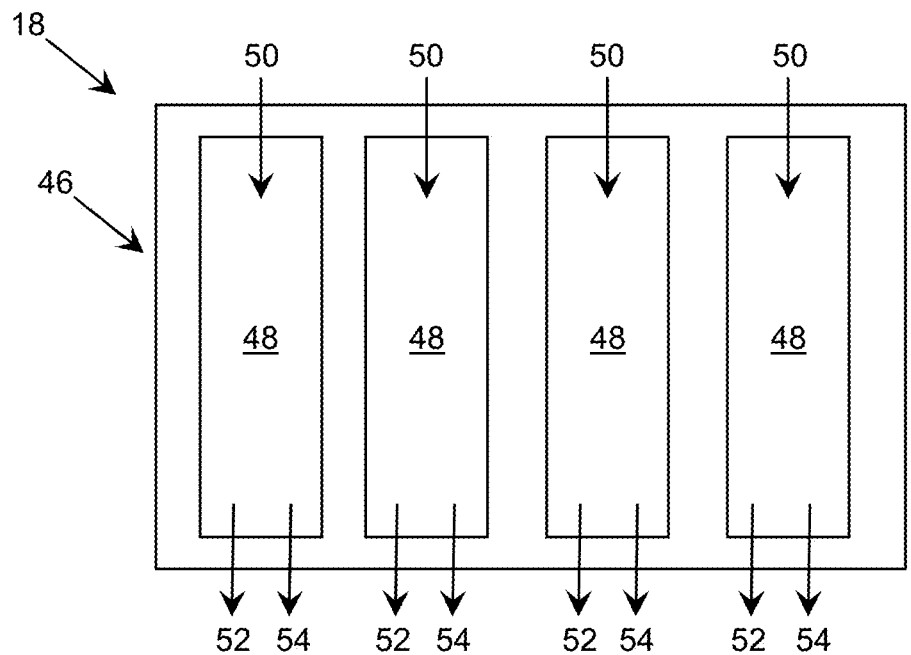
Figure 6B:
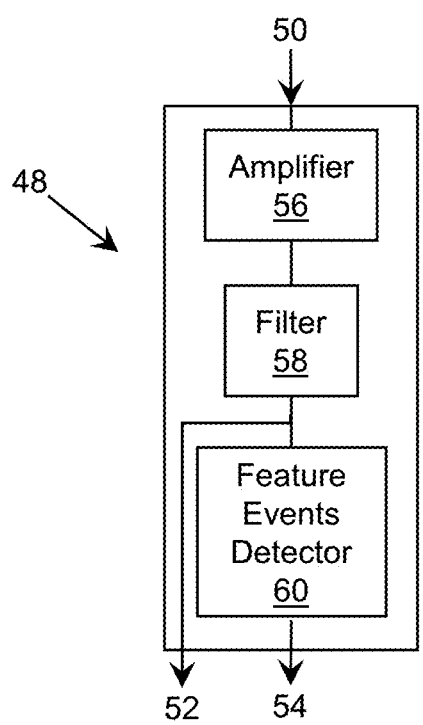
FIG. 6B shows a more detailed schematic block diagram view of one of the signal conditioning and pre-processing channels depicted in FIG. 6A according to embodiments.

FIG. 6A shows a more detailed schematic block diagram view of an illustrative embodiment of the signal conditioner 18 depicted in FIG. 1 with a pre-processing component 46, while FIG. 6B shows a more detailed schematic block diagram view of an illustrative embodiment of one of the signal conditioning and pre-processing channels depicted in FIG. 6A according to embodiments. As shown in FIG. 6A, the signal conditioner 18 can include a plurality of signal conditioning and pre-processing channels 48. Each signal conditioning and pre-processing channel 48 can receive signals from one of the sensing assemblies 16. In one embodiment, each signal conditioning and pre-processing channel 48 receives signals from a different one of the sensing assemblies 16, so that each channel is operatively coupled to only one of the sensing assemblies. In a scenario where the sensing assemblies 16 are configured to detect variations in the flux about bands 14 that are configured as magnetic bands, the sensing assemblies can generate signals that are representative of the variations in the magnetic flux. It is understood that the sensing assemblies 16 can be configured to directly detect the level of magnetic flux over time, as with a magnetometer, or indirectly detect the variations through voltage or current signals representative of the variations in the flux, e.g., using electromagnetic induction.

As shown in FIG. 6A, each signal conditioning and pre-processing channel 48 receives the signals generated from one of the sensing assemblies 16 at an input 50. The signal conditioning and pre-processing channels 48 can condition and pre-process the received signals. In one embodiment, the signal conditioning and pre-processing channels 48 can amplify and/or filter the signals and identify or detect feature events in the amplified and filtered signals. The signal conditioning and pre-processing channels can output the amplified and filtered signals and the detected feature events to the computing unit 24 through output lines 52 and 54 for computation of torque and related parameters. The related parameters can include, but are not limited to, twist, radial displacement of the rotating component 12 with the bands 14, angular offset of the bands 14 with the axis of rotation of the rotating component due to the radial displacement, apparent angular phase difference between the bands 14, higher order statistics, time and/or frequency domain profiles of the signals and other derived values such as, for example, rotational speed.

FIG. 6B shows an example of components within one of the signal conditioning and pre-processing channels 48 that can perform the signal conditioning and pre-processing functions. In one embodiment, each signal conditioning and pre-processing channel 48 can comprise an amplifier 56 and a filter 58 connected in series to amplify and filter the signals received at the input 50, and a feature events detector 60 to identify feature events in the amplified and filtered signals. In this example, the amplified and filtered signals can be outputted through the signal conditioning and pre-processing channel 48 at output line 52, while the detected or identified feature events can be outputted through the output line 54.

In one embodiment, the filter 58 can include a bandpass filter that allows desired signals from the rotating bands 14 affixed to the rotating component 12 to pass through the output line 52 of the signal conditioning and pre-processing channel 48 and enter the feature events detector 60 for pre-processing (e.g., feature event detection). In this manner, the filter 58 can block unwanted interference, such as low frequency AC and high frequency RF signals, and the feature events detector 60 can identify one or more selected features from the filter signals. As noted herein, the selected features that can be detected as feature events can include, but are not limited to signal peaks, zero crossings, signal gaps (e.g., on-off keying), etc. In a scenario in which zero-crossings is one of the selected features to be detected as a feature event, the feature events detector 60 can take the form of a comparator.

In response to receiving the amplified and filtered signals, and the identified feature events from each of the signal conditioning and pre-processing channels 48 associated with the signal conditioner 18, the computing unit 24 (FIG. 1) can determine the torque of the rotating component, including any of the related parameters. FIGS. 7A-7C show a flow chart describing an algorithm that can be implemented in the computing unit 24 that determines the torque applied to a rotating component as well as some of the parameters according to an embodiment. In particular, FIG. 7A outlines how the computing unit 24 can sample the conditioned signal inputs from the output lines 52 of the signal conditioner 18 (e.g., one of the outputs of the signal conditioning and pre-processing channels 48). For instance, in action 62, the sampling includes recording a signal level from each sensing assembly 16. As used herein, the signal level means the signal strength or the voltage or current magnitude (e.g., as measured by an analog to digital converter) or the flux level (e.g., as measured by a magnetometer) of the signals of the output lines 52 (e.g., the amplified and filtered signals) from the signal conditioner 18 that are inputted to the computing unit 24. The signal levels can be obtained from the signals by approaches that include, but are not limited to, use of an analog to digital converter, an analog comparator, and/or the like.

In one embodiment, the computing unit 24 can process the signal levels to provide a measure of the average signal strength for each sensing assembly. In particular, the computing unit 24 can determine the average signal strength of the signal output from each signal conditioning and pre-processing channel for multiple signal samples. In this manner, each average signal strength determination for a signal conditioning and pre-processing channel will be indicative of a measure of the average signal strength of the respective sensing assembly that is operatively coupled to the channel.

After recording the signal level from each sensing assembly 16, in action 64, the computing unit 24 waits one signal level sampling period. As used herein, waiting one signal level sampling period means halting the signal sampling mechanism for a period of time. After waiting one signal level sampling period, the computing unit 24 can return to action 62 to continue to record additional signal levels from each sensing assembly 16. The recording of signal levels at action 62 and waiting one signal level sampling period before recording additional levels at action 64 can continue as long the rotating component 12 rotates or for a desired monitoring time period.

In embodiments in which the bands 14 are magnetic bands, the recording of signal levels and waiting one signal level sampling period before recording additional levels can occur in general, at a rate that is significantly faster than the rate of the north to south pole transitions per magnet band. For example, this rate can correspond to the rotation rate of the rotating component times the number of magnets per magnet band divided by two. A high sampling rate provides the fidelity which allows each sensing assembly's conditioned signals to be accurately reconstructed.

During the time that the signal levels are being recorded, the computing unit 24 can process the identified feature events that are received from the output lines 54 of the signal conditioner 18. FIG. 7B shows illustrative operations associated with the processing of the identified feature events detected by the signal conditioning and pre-processing channels of the signal conditioner 18. These operations can include, in action 66, the computing unit 24 waiting for an indication that a feature event has been detected in the signals generated from any of the sensing assemblies 16. For example, the computing unit 24 can wait to receive an indication from any of the signal conditioning and pre-processing channels in the signal conditioner that its respective event detector identified a feature event in the signals received from the sensing assembly to which it is operatively coupled.

The detection of a feature event by any of the signal conditioning and pre-processing channels results in the signal conditioner providing an indication of the feature event to the computing unit 24 at action 68, as well as an indication of the corresponding sensing assembly that generated the signal having the feature event. The receipt of the indication of the feature event and the corresponding sensing assembly that generated the signal having the feature event are basically external inputs to the algorithm implemented in the computing unit 24 that is used to determine the torque and related parameters of the rotating component 12. The receipt of these indications results in an interruption to the algorithm that causes the computing unit 24 to record a timestamp of the reception event in action 70. Each timestamp can include the time that the event was received, the type of feature event that was detected, and the sensing assembly that generated the signal having the feature event.

The waiting for feature event indications, the receipt of feature event indications, and recording of timestamps as depicted in actions 66, 68, 70, respectively, of FIG. 7B, continues over a feature event collection interval. A boundary of the feature event collection interval can result from one or more occurrences, such as the detection of feature events from all sensing assemblies, a timeout based on a minimum operating speed, two consecutive feature events from the same assembly, and/or other predictions based on recent measurements. In an embodiment in which the bands 14 are magnetic bands and the sensing assemblies are sensing coil assemblies, the feature event collection interval would normally encompass the average north-to-south pole transition time associated with the magnetic bands plus an error of margin.

Once the computing unit 24 determines that the feature event collection interval is over in action 72, the computing unit 24 can continue with additional operations that pertain to the review of the feature event indications. For example, after it is determined in action 72 that the feature event collection interval is over, in action 74, the computing unit 24 can make an assessment to determine whether all feature event indications have been received from all of the sensing assemblies (via their corresponding signal conditioning and pre-processing channel) during the feature event collection interval. If it is determined that not all of the feature event indications have been received from all of the sensing assemblies for the current interval, then in action 76, the computing unit 24 flags any sensing assembly from which feature event indications have not been received as a "drop-out" condition. As used herein, flagged as a "drop out" condition means that a physical feature event was not detected by the feature event detector.

FIG. 8 illustrates an example depicting the processing of feature events over a multiple of collection intervals, including the noting of sensing assemblies that have not received feature event indications as dropouts. In this example, there are four signal feature event collection intervals that each depict the timing and sequence of receiving feature event indications from four sensing assemblies that operate in conjunction with the bands affixed to a rotating component, like with the configuration illustrated in FIG. 1. The boundaries between the four intervals are depicted in FIG. 8 with dashed lines. In this example, the four sensing assemblies are identified as A1, A2, B1 and B2. If a feature event associated with a sensing assembly is identified in an interval then its detection is illustrated in FIG. 8 with a solid line and reference label noting the particular sensing assembly. The timing and sequence of the detection of a feature event for a particular sensing assembly with regard to the identification of a feature event from the other sensing assemblies is also noted in the interval. For example, in the first interval, a feature event from sensing assembly A1 is received first, followed by indications from sensing assemblies B2, A2 and B1.

If a feature event associated with a sensing assembly is not identified in a particular interval, then the sensing assembly is not depicted with a solid line and an accompanying reference label for that interval. For example, in FIG. 8, the first interval and the fourth interval are illustrated as having detected feature events for all sensing assemblies, while the second interval is depicted as not detecting a feature event from sensing assembly B2, and the third interval is depicted as not detecting a feature event from sensing assembly A1. As a result, in this example, the sensing assembly B2 and the sensing assembly A1 can be flagged as experiencing a drop-out condition in the second and third intervals, respectively.

It is understood that other approaches can be used to determine whether sensing assemblies have experienced drop-out conditions. In one embodiment, the expected timing of the drop-out conditions can be estimated depending on the circumstances, and available timestamp histories and statistics. As an example, physical shaft inertia can prevent rapid changes in rotational speed, and thus over a short time period the occurrence of feature events, even those not detected, can be predicted.

Referring back to FIG. 7B, after flagging any sensing assemblies that have experienced drop-out conditions for the current collection interval in action 76, the computing unit 24 can continue to action 78 where the computing unit 24 can apply a compensation in those instances where a feature event indication was not received by one or more of the sensing assemblies in the collection interval. For example, this can be done by interpolating between two detected events, extrapolating based on recent events, and/or the like.

After the sampling of the signals from the sensing assemblies (FIG. 7A) and the feature event indication processing of FIG. 7B is completed for the current collection interval (e.g., concluding in action 74 or 78), the computing unit 24 can proceed with the torque and related parameters computation, e.g., as illustrated in FIG. 7C. In particular, the torque and related parameters computation operations of FIG. 7C can begin as the signal strengths and signal feature timestamp data from the current collection interval are fed into the torque computation part of the algorithm. First, as shown in FIG. 7C, in action 80, the computing unit 24 can compare the current timestamps with the timestamps from the previous interval. The difference between these timestamps can be used to approximate the rotational speed during that time interval.

Next, in action 82, the computing unit 24 can determine the rotation speed of the rotating component. In general, the rotation speed for a rotating component, such as a shaft, can be determined according to the following equation:

$$\text{Rotation Speed} = 1/(\text{Rotation Period}) \quad (1)$$

For an embodiment in which bands, such as magnetic bands with magnetic segments, are affixed to the rotating component and a pair of sensing coil assemblies are operatively coupled to each band on the rotating component, one can determine the rotation period as a function of the detected feature events identified for each sensing assembly. As a result, the rotational speed of the rotating component can be determined according to the following equation:

$$\text{Rotation Speed} = 1/(\text{total time between } M/2 \text{ consecutive signal feature events from the same sensing coil}) \quad (2)$$

where, in the case of a magnet band, a signal feature event is a high or low peak or a rising or falling zero crossing, and M is the number of magnets in the associated magnet band.

With the rotation speed computed, the torque of the rotating component can be determined as well as other related parameters, such as the twist of the rotating component that is induced by the torque. In a scenario where the rotating component (e.g., a shaft) has magnetic bands affixed thereto, and sensing coil assemblies operatively coupled with each of the bands, the twist can be determined as a function of several parameters that pertain to the rotating component, the magnetic bands, and the sensing coil assemblies. For example, the twist of a rotating component whose axis of rotation is centered between all of the sensing coils can be determined based on the angular difference of the poles of the two magnetic bands affixed to the rotating component. In one embodiment, this angular difference or offset of the poles of the magnetic bands can be measured as a timing difference between the feature events from the sensing coil assemblies of each band. To convert this timing difference to an angular phase difference, the value is multiplied by the rotational speed and then multiplied by 360 degrees.

However, the timing difference between the feature events from the sensing coil assemblies of each band can be affected by the radial displacement of the rotating component because in the general case, the axis of rotation of the rotating component may not be centered between the sensing assemblies. This radial displacement, relative to the sensing coil assemblies, affects the timing of signal feature events as seen by the sensing coils. As a result, the radial displacement will ultimately impact the measurements of the angular or phase difference of the bands, and therefore, the twist.

As described herein, if the radial displacement of the rotating component can be determined, then an impact on the twist can be geometrically compensated for by a radial displacement offset applied to the twist calculation. In the various embodiments that utilize magnetic bands and sensing coil assemblies, the radial displacement of the rotating component can be determined because there are at least two sensing coil assemblies per magnet band. In particular, the timing difference (and therefore phase difference) between signal feature events at each of the sensing coil assemblies of the magnet band, along with the received signal strengths from each of the sensing coil assemblies are both measured quantities that can be used to determine the radial displacement of the rotating component.

Figure 9A:
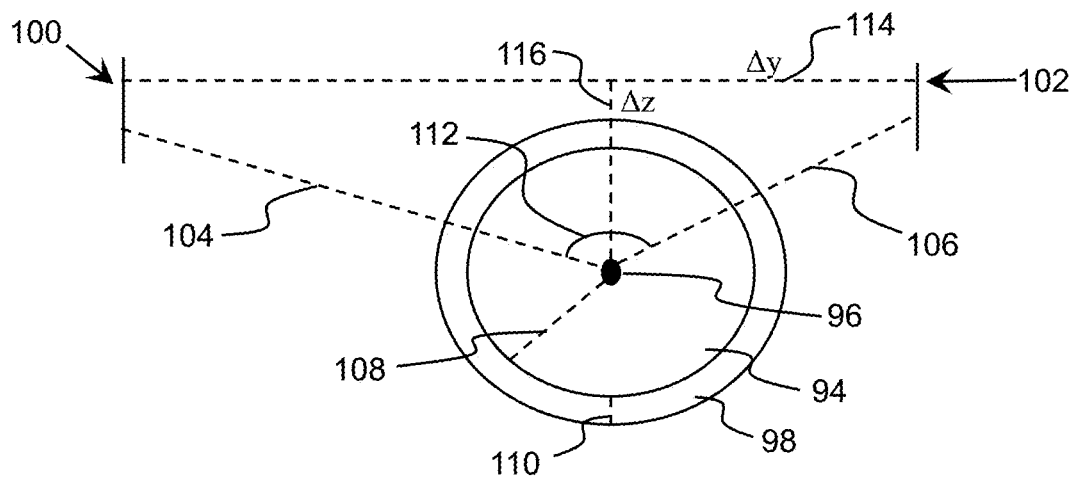
FIGS. 9A-9C illustrate an example of radial displacement of a rotating component with respect to a pair of sensing assemblies that operate in conjunction with a band affixed to the rotating component, and how the radial displacement can be used derive a radial displacement offset that is used in a twist calculation according to an embodiment.
Figure 9B:
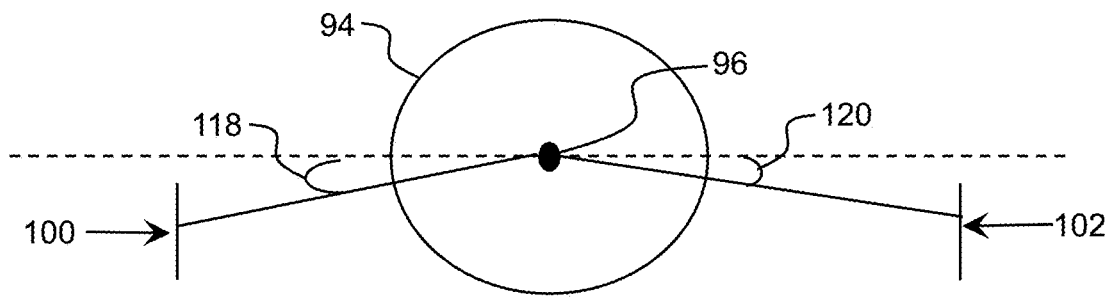
Figure 9C:
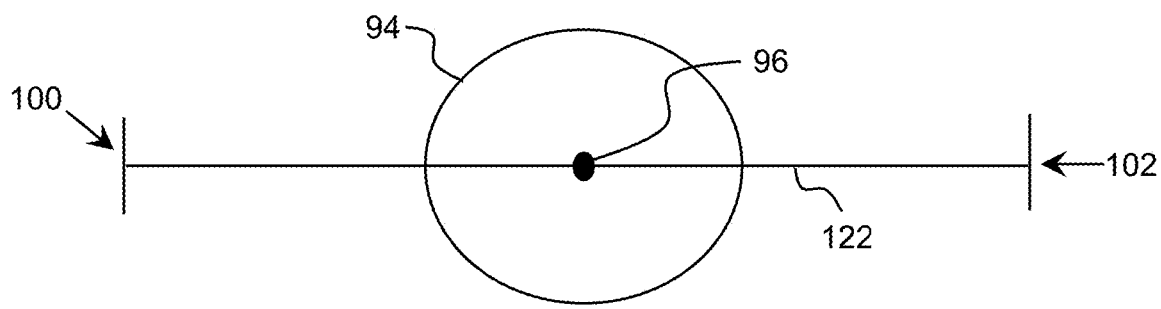

FIGS. 9A-9C illustrate an example of radial displacement of a rotating component, such as a shaft, with respect to a pair of sensing assemblies that operate in conjunction with a band affixed to the rotating component, and how the radial displacement can be used derive a radial displacement offset that is used in a twist calculation according to an embodiment. In particular, FIG. 9A shows a rotating component 94 with an axis of rotation 96, a band 98, such as a magnetic band, installed on the rotating component, and a pair of sensing assemblies 100 and 102, such as sensing coil assemblies, each on opposing sides of the rotating component 94. As illustrated in FIG. 9A, a phase difference between the two sensing assemblies 100 and 102 uniquely determines the physical angle formed by the rotating component axis of rotation 96 relative to these two sensing assemblies.

Signal strength measurements from the sensing assemblies 100 and 102 are indicative of the distances between the band 98 and the two sensing assemblies 100 and 102, respectively. The distances 104 and 106 from the rotating component axis of rotation 96 to the two sensing assemblies 100 and 102, respectively, can be determined based on physical principles for flux decrease with distance, assuming that a radius 108 of the rotating component 94 and a thickness 110 of the band 98 are known. By applying basic trigonometric principles, the combination of the distances 104 and 106 between the rotating component axis of rotation 96 and the two sensing assemblies 100 and 102, respectively, and an angle 112 between the rotating component axis and the sensing assemblies 100 and 102 is sufficient to determine a radial displacement 114 and 116 of the rotating component 94. As shown in FIG. 9A, the radial displacement 114 and 116 translates to an offset of the rotating component 94 that is characterized by a change in the y-direction ($\Delta y$) and a change in the z-direction ($\Delta z$), respectively. In the various embodiments, this radial displacement offset can be applied to a twist calculation in order to compensate for an effect that radial displacement will have on the twist.

Both FIGS. 9B and 9C further demonstrate how the radial displacement of the rotating component results in a physical angle with respect to the sensing assemblies of each band. Note that for clarity in demonstrating the radial displacement, the band(s) are not depicted in FIGS. 9B and 9C. In the example illustrated in FIG. 9B, the axis of rotation 96 of the rotating component 94 forms an angle 118 with the sensing assembly 100 and an angle 120 with the sensing assembly 102. Although the angles depicted are for only one band that is affixed to the rotating component 94, it is understood that additional bands on the rotating component could have physical angles formed with their respective sensing assemblies. Further, it is noted that each of the bands may be displaced with respect to its corresponding sensing assemblies by different amounts. In any event, the differences in the physical angles from each band's sensing assemblies can be subtracted, with the result equaling the radial displacement phase difference.

In the example illustrated in FIG. 9C, the axis of rotation 96 of the rotating component 94 is centered between the sensing assemblies 100 and 102 as noted by the line 122 that extends between the sensing coil assemblies 100 and 102 and passes directly through the axis of rotation 96. Therefore, in the example illustrated in FIG. 9C, the physical angles of the axis of rotation 96 of the rotating component 94 relative to the sensing assemblies 100 and 102 are zero degrees. The resulting radial displacement phase difference in this example is thus zero degrees.

The ability to determine the radial displacement and the angular offset enables the various embodiments to determine the twist that is induced by the torque to a rotating component with bands and sensing assemblies. As discussed herein, embodiments of the present invention can determine the twist as a function of the radial displacement of the rotating component with the bands, the angular offset of the bands with the axis of rotation of the rotating component due to the radial displacement, the apparent angular phase difference between the bands, and a predetermined angular phase difference between the bands that is obtained under a known torque condition. Computation of the twist based on these factors enable the calculation of the torque to the rotating component.

Referring back to FIG. 7C, details of an illustrative computation of the twist and torque for a rotating component that operates in a system like the one depicted in FIG. 1 is explained in more detail. As shown in FIG. 7C, after the computing unit 24 compares current timestamps with the timestamps from the previous interval in action 80 and the computing unit 24 determines the rotation speed of the rotating component in action 82, the computing unit 24 can determine parameters associated with the twist calculation. In particular, in action 84, the computing unit 24 can determine a radial displacement of the rotating component with each of the bands. More specifically, the computing unit 24 can determine the radial displacement as a function of the strength of the signals and the feature events timestamps received from the sensing assemblies associated with each of the bands.

After ascertaining the radial displacement of the rotating component with each of the bands, in action 86, the computing unit 24 can determine an angular offset due to the radial displacement of each band. For example, as illustrated in FIG. 9A, the computing unit 24 can determine the radial displacement as a change in the y-direction ($\Delta y$) and a change in the z-direction ($\Delta z$). The computing unit 24 can determine the angular offset from the radial displacement, e.g., using known trigonometric identities.

In action 88, the computing unit 24 can determine an apparent angular difference between each band based on the difference in feature event timestamps measured between the sensing assemblies of one band versus another band. As used herein, "apparent" refers to an initial difference in phase, before accounting for signal distortions which cause false indications of twist. In one embodiment, the computing unit 24 determines the apparent angular difference by ascertaining an apparent difference in the feature event timestamps received from the sensing assemblies associated with each of the bands and comparing the differences in the feature event timestamps from one band against the feature event timestamps of another band. The apparent angular phase difference between the bands is thus based on the differences in the feature event timestamps of the bands.

With the angular offset and apparent angular difference information, in action 90, the computing unit 24 can determine a twist of the rotating component. In one embodiment, the computing unit 24 determines the twist according to the following equation:

$$\text{Twist} = \text{Apparent Angular Difference} - \text{Angular Offset Due to Radial Displacement} - \text{a Predetermined Angular Phase Difference} \quad (3)$$

In this computation, the predetermined angular phase difference is utilized to account for the bands not being perfectly aligned to the rotating component during installation. In one embodiment, the predetermined angular phase difference is the angular phase difference of the bands obtained under a known torque condition. In one example, a predetermined angular phase difference can be obtained at installation as the bands are typically not perfectly aligned during installation, and thus, there is an angular difference at zero torque conditions. In this case, the predetermined angular phase difference at zero torque conditions can be determined during a system commissioning by having the computing unit 24 run an algorithm similar to the algorithm shown in FIGS. 7A-7C at zero torque. In this manner, the computing unit 24 can store the predetermined angular phase difference at zero torque conditions in persistent memory for subsequent access for future twist computations that are part of the torque determination of the subject rotating component. It is understood that a predetermined angular phase difference obtained at zero torque conditions is only one example of a value that can be utilized in the twist determination, and that other torque conditions can be used to derive a predetermined value that is suitable for use in computing twist.

After determining the amount of twist to the rotating component, in action 92, the computing unit 24 can determine a torque applied to the rotating component. In one embodiment, the computing unit 24 determines the torque according to the following equation:

$$\text{Torque} = K * \text{Twist} \quad (4)$$

where K is a constant that depends on the material and geometry of the rotating component. It is understood that this constant can be determined based on theoretical calculations or experimental measurements of twist versus torque.

It is understood that the operations illustrated in FIGS. 7A-7C are illustrative of only one approach for determining torque and related parameters from a rotating component that is configured with bands and sensing assemblies to obtain operational data from the rotating component. For example, the operations can include more or less actions than those described in FIGS. 7A-7C. Also, it is understood that some of these actions can be performed in a different order than that described.

In one embodiment, the computing unit can supply the torque calculation as well as other related parameter calculations including, but not limited to, twist, radial displacement, angular offset due to the radial displacement, apparent angular difference between each band, and/or the like, to a data acquisition unit, like the one depicted in FIG. 1. The data acquisition unit can use this data to perform a number of different functions that include, but are not limited to, logging the data and calculations, visualization of the data and calculations for facilitating a qualitative analysis, image analysis including one-dimensional, two-dimensional, three-dimensional, and four-dimensional visualizations, and performing additional analyses.

Figure 10:
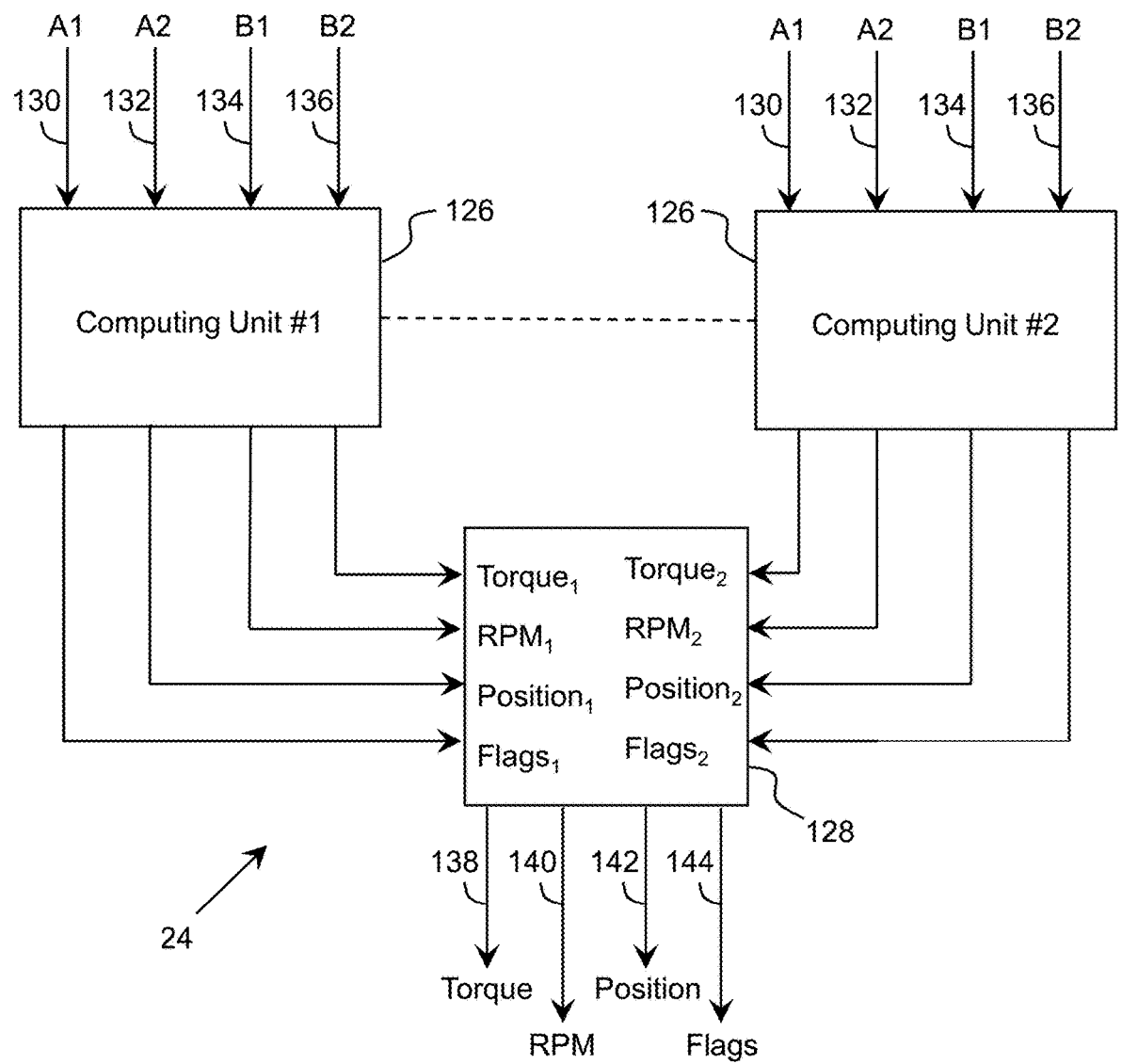
FIG. 10 shows a schematic block diagram of an illustrative computing unit having a multiple of interlocked computing sub-units with an output combiner to ascertain the torque applied to a rotating component according to an embodiment.

FIG. 10 shows a schematic block diagram of an illustrative computing unit 24 that can be used to receive and process data provided by the signal conditioner according to an embodiment. As shown in the schematic block diagram of FIG. 10, the computing unit 24 can include a multiple of interlocked computing sub-units 126 (represented by the connecting dashed line) with an output combiner 128 to ascertain the torque applied to a rotating component according to an embodiment. Although FIG. 10 only shows two interlocked computing sub-units 126 (Computing Unit #1 and Computing Unit #2), it is understood that more computing sub-units can be utilized in this interlocked arrangement.

Each of these interlocked computing sub-units 126 can be operatively coupled to the signal conditioner 18 (FIG. 1). As depicted in FIG. 10, the interlocked computing sub-units 126 receive the same set of input signals that are provided by the signal conditioner 18. These input signals can include the filtered and pre-processed signals obtained from each pair of sensing assemblies 16 (FIG. 1) that are operatively coupled to the two bands 14 (FIG. 1) affixed to the rotating component. In FIG. 10, the filtered and pre-processed signals from the signal conditioner 18 that are associated with a pair of sensing assemblies that are coupled to a first band are identified by reference labels A1 and A2, while the filtered and pre-processed signals from the signal conditioner 18 that are associated with another pair of sensing assemblies that are coupled to a second band are identified by reference labels B1 and B2. Both interlocked computing sub-units 126 receive the filtered and pre-processed signals that are associated with the sensing assemblies A1, A2, B1, B2 from data lines 130, 132, 134 and 136, respectively.

In one embodiment, the interlocked computing sub-units 126 are each configured to independently determine the torque applied to the rotating component based on the conditioned and pre-processed signals received from the sensing assemblies A1, A2, B1, B2 along data lines 130, 132, 134 and 136, respectively. As shown in FIG. 10, the interlocked computing sub-units 126 are operatively coupled to the output combiner unit 128, which can aggregate all of the data computed in the interlocked computing sub-units 126. In one embodiment, the computed data that is aggregated includes torque, rotation speed (RPM), position data (e.g., displacement, angular offset due to the radial displacement, apparent angular difference), and flags (e.g., drop-outs). This aggregated data can be provided to another computing unit such as the data acquisition unit 26 (FIG. 1) or some other remote host computer along data lines 138, 140, 142, and 144. It is understood that the output combiner unit 128 can aggregate a variety of any of the computed information described herein (e.g., higher order statistics, time and/or frequency domain profiles) in addition to or in place of the torque, rotational speed, position data, and flags data.

In one embodiment, the computing unit 24 formed of the interlocked computing sub-units 126 can be used to function in lock-step in a fault-tolerant system operation to perform a real-time software validation of any of the computed data. For example, upon reaching a certain validation state, each of the interlocked computing sub-units 126 can generate validation output that sufficiently captures that computing unit's state. In one embodiment, determination of the torque by the interlocked computing sub-units 126 in each interval can be considered a validation state, while the computed torque can be considered the validation output. The output combiner unit 128 can receive the validation output from each of the interlocked computing sub-units 126 and compare these outputs (e.g., the computed torques) to determine the final system output values. In one embodiment, the output combiner unit 128 can determine if there is a discrepancy based on a comparison of outputs. If the output combiner unit 128 determines that there is a discrepancy in the validation outputs of the two computing sub-units 126, then it can generate a fault condition.

In order for the interlocked computing sub-units 126 and the output combiner unit 128 to operate in this scenario of determining certain validation outputs and ascertaining whether there is a discrepancy, the computing sub-units should be interlocked in such a way that, while executing in a full lock-step mode, both computing sub-units 126 must have completed the previous state before execution may proceed. In one embodiment, the functionality of the output combiner unit 128 can be integrated into the computing sub-units 126 themselves because the individual computing sub-units are interlocked. In an embodiment in which three or more computing sub-units 126 are used, the lock-step computing arrangement can be utilized to identify the source of a fault condition and provide a valid output based on a majority consensus of a correct state and output. For example, if two of the sub-units report a result value of 3 and the third reports a value of 4, in a majority consensus the result is taken to be 3, but in a unanimous consensus the value is taken to be invalid.

Figure 11:
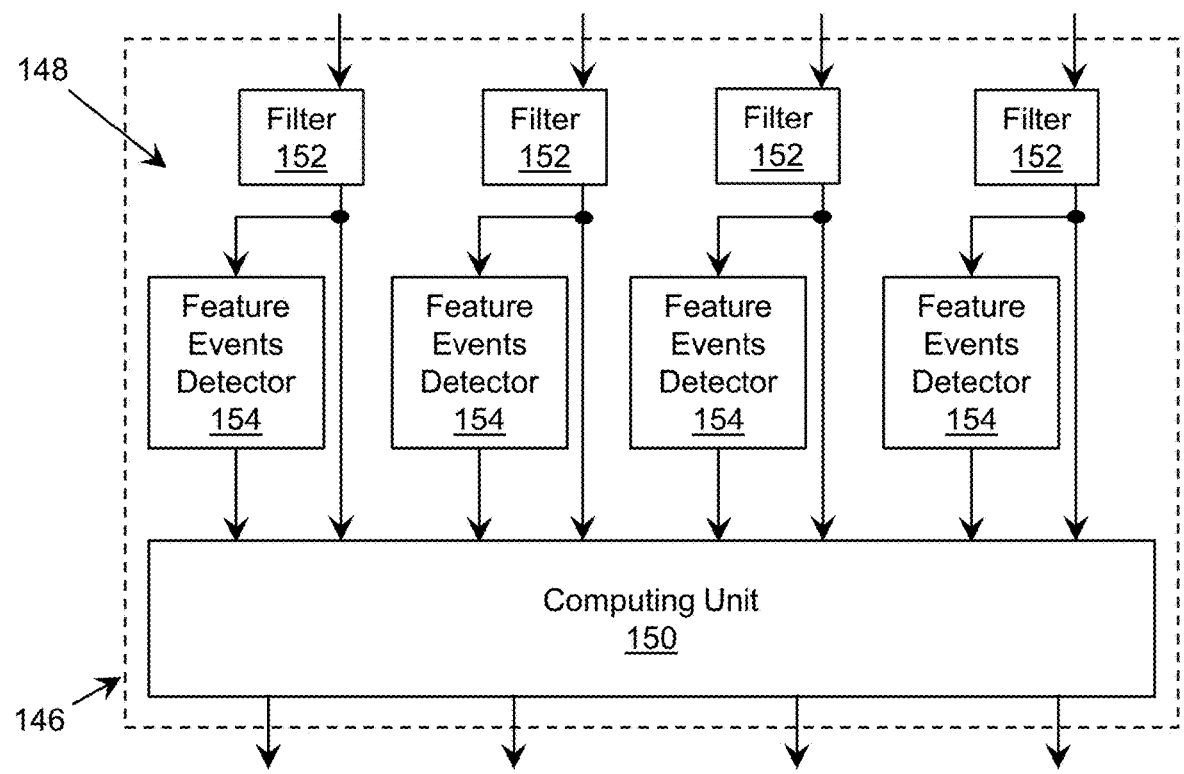
FIG. 11 shows a schematic block diagram of a digital signal processor that integrates a signal conditioner and a computing unit according to an embodiment.

FIG. 11 shows an alternative embodiment to implementing the signal conditioner and computing unit arrangement depicted in FIG. 1. In particular, FIG. 11 shows a schematic block diagram of a digital signal processor 146 that integrates a signal conditioner 148 with a pre-processing component and a computing unit 150 according to an embodiment. As shown in FIG. 11, the signal conditioning with pre-processing component 148 can include filters 152 and feature events detectors 154. The filters 152 and the feature events detectors 154 can be implemented with digital components that includes a mix of hardware and software. In operation, the filters 152 can filter the signals received from the sensing assemblies and the feature events detectors 154 can identify feature events in the filtered signals.

Although not shown in FIG. 11, the amplifiers can be connected to the filters 152 in order to amplify the signals received from the sensing assemblies prior to filtration. In this embodiment, one of the filters 152 is serially connected to one of the feature events detectors 154. Each coupled filter 152 and feature events detector 154 is configured to receive signals from one of the sensing assemblies that is operatively coupled to one of the bands affixed to the rotating component. In this manner, each coupled filter 152 and feature events detector 154 can function as a signal conditioning and pre-processing channel that conditions and pre-processes the signals received from a corresponding sensing assembly. After conditioning and pre-processing the signals from the sensing assemblies, the digital signal processor 146 can pass these signals to the computing unit 150 where the torque and other related parameters can be computed as described herein.

Although the approaches to determining torque, twist and related parameters of a rotating component have been described herein for the most part with respect to the system 10 depicted in FIG. 1, it is understood that the various embodiments of these approaches can be implemented in other systems. In addition to possible changes to the type of computing unit and signal conditioner that are utilized, the various embodiments can have alternative implementations to the sensing assemblies and/or the bands. For example, instead of having a pair of sensing assemblies operatively coupled to a band that is affixed to the rotating component, the various embodiments of the present invention can be configured to have more than two sensing assemblies coupled to each band. In one embodiment, at least four sensing assemblies can be operatively coupled to each band. For example, an arrangement in which four sensing assemblies are utilized with a band provides the various embodiments with the capability to measure torque on a rotating component, such as a shaft, whose rotational axis may be radially displaced, based solely on signal phase.

In an alternative embodiment, four sensing assemblies per band can allow for independent measurements from two independent pairs of sensing assemblies. Combining results from such a configuration can result in a more accurate torque measurement than in an embodiment in which only two sensing assemblies are used. Other advantages to using four or more sensing assemblies per band is that such an arrangement offers resiliency. For example, in a scenario where there is a failure in one or more of these sensing assemblies, the system can fall back on the remaining operable assemblies to obtain data for ascertaining torque and the other related parameters. In this case, even though such a failure makes the system less capable and accurate, it can still be considered functional.

In addition to varying the number of sensing assemblies that are utilized, the various embodiments can be configured with other types of sensing assemblies that differ from the sensing coil assemblies described herein. Other sensing assemblies that can be utilized include, but are not limited to, Hall effect sensors and magnetoresistors (e.g. anisotropic magnetoresistors (AMR), giant magnetoresistors (GMR), tunneling magnetoresitors (TMR), and fluxgate sensors). In one embodiment, a sensing assembly can include TMRs that are configured to operate with dual polarity to generate sine waves.

Figure 12:
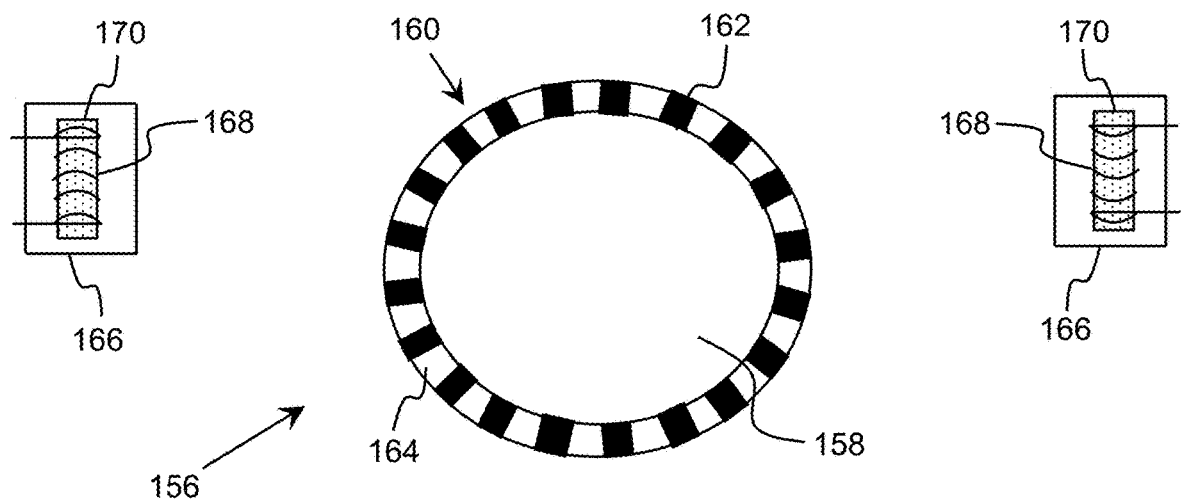
FIG. 12 shows a schematic of a system to measure and monitor torque of a rotating component that utilizes bands having metallic segments of ferrous metal and non-ferrous metal along a perimeter of the bands, wherein the ferrous metal and the non-ferrous metal are arranged along the perimeter in an alternating pattern according to an embodiment.

Possible changes to the bands that are used with any of the various embodiments described herein can include using bands that differ from the magnetic bands described herein. In one embodiment, a band that comprises alternating metallic segments of ferrous metal and non-ferrous metal can be utilized. FIG. 12 shows an example of a band 156 affixed to a rotating component 158 that comprises metallic segments 160 of ferrous metal 162 and non-ferrous metal 164 along a perimeter of the band. Examples of ferrous metal that can be used in segments 160 of the band 156 include, but are not limited to, iron, neodymium, etc., and examples of non-ferrous metal that can be used as segments include, but are not limited to, aluminum, copper, titanium, etc. As shown in FIG. 12, the ferrous metal 162 and the non-ferrous metal 164 can be arranged along the perimeter of the band 156 in an alternating pattern. In one embodiment, the metallic segments 160 can include an alternating pattern having an even number of ferrous metal 162 and non-ferrous metal 164 segments.

FIG. 12 also shows that the sensing assemblies that are used with the band 156 of metallic segments 160 of ferrous metal 162 and non-ferrous metal 164 can include any of the embodiments described herein. In one embodiment, the sensing assemblies can comprise a coil wrapped around a magnetic core. For example, FIG. 12 shows a pair of sensing assemblies 166 located on opposing sides of the rotating component 158 facing the band 156. As shown in FIG. 12, each sensing assembly 166 can include a coil 168 wrapped around a magnetic core 170. Advantages of utilizing bands having metallic segments of ferrous metal and non-ferrous metal along a perimeter of the bands with sensing assemblies of coil wrapped around a magnetic core as depicted in FIG. 12 can include, but are not limited, immunity to loss of magnetic properties due to temperature and/or de-Gaussing.

It is understood that the enumeration of the embodiments and alternatives described herein are not meant to be construed as a complete or exclusive list. Instead, all other reasonable embodiments or derivations of the various embodiments and alternatives are subsumed within the descriptions provided.

Figure 13:
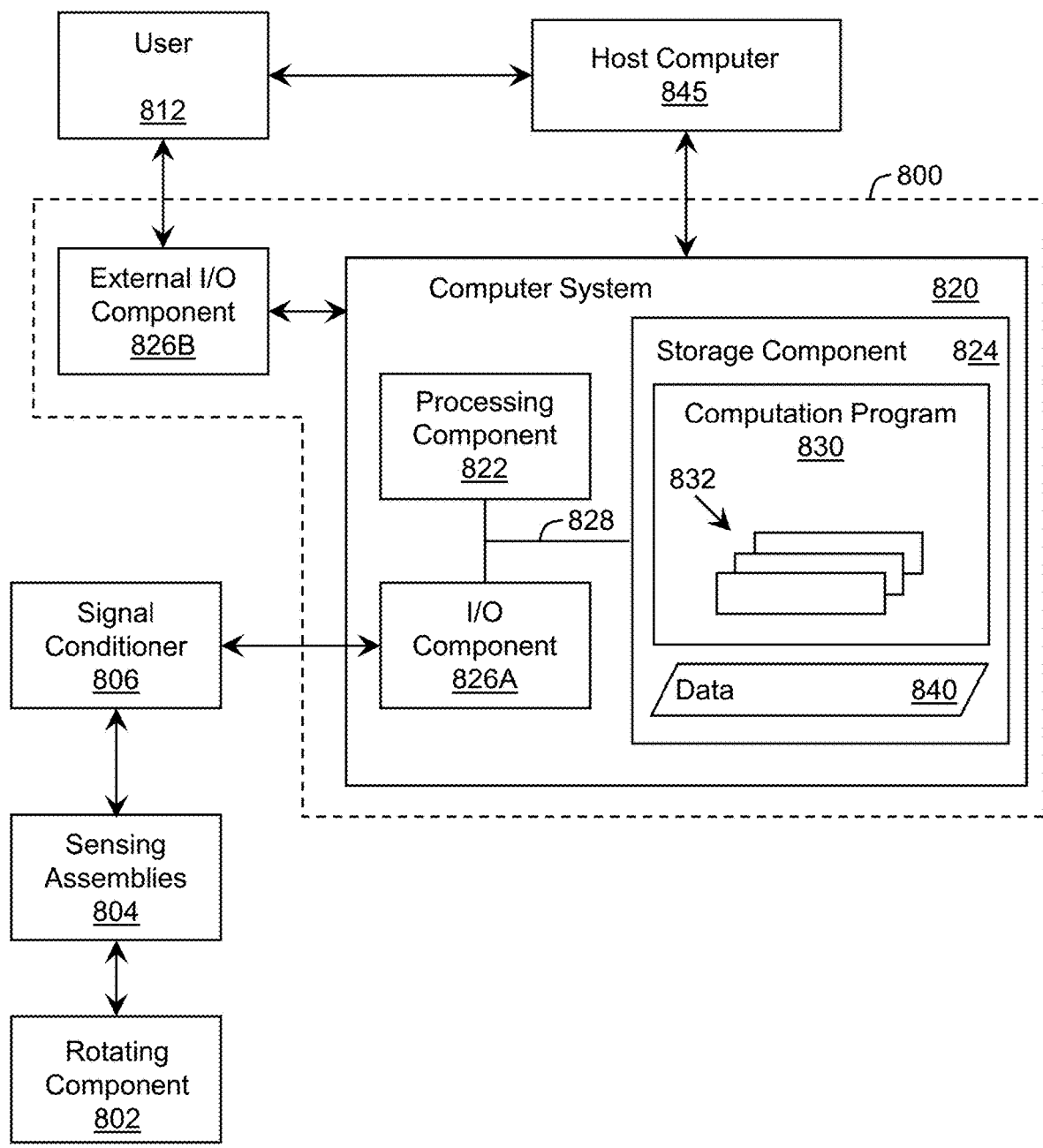
FIG. 13 shows a schematic block diagram representative of an overall processing architecture for measuring and monitoring torque and related parameters in a rotating component according to an embodiment.

FIG. 13 shows a schematic block diagram representative of an overall processing architecture 800 that can be used for measuring and monitoring torque and related parameters in a rotating component 802 based on signals generated from sensing assemblies 804 and conditioned by a signal conditioner 806 according to an embodiment. Data corresponding to the torque and related parameters can be provided to a host computer 845 for further processing. In this embodiment, the signal conditioner 806 and host computer 845 are not illustrated as part of the overall processing architecture 800, however it is understood that these components could be implemented as part of the architecture.

As depicted in FIG. 13, the overall processing architecture 800 can include a computer system 820 including a computation program 830, which makes the computer system 820 operable to receive and process signals provided by the signal conditioner 806 in the manner described herein. In particular, the computation program 830 can enable the computer system 820 to perform computations from the signal data that pertain to the rotating component 802 including torque, twist and related parameters not limited to, radial displacement, angular phase, angular offset, higher order statistical data, time and/or frequency domain profiles of the signals and other derived values such as rotational speed.

The computer system 820 can store the computations as data 840 which like the computation program 830 is stored in a storage component 824 in the computer system 820. In addition, the computer system 820 can provide the computation data to a host computer 845 which can perform a variety of tasks that include but are not limited to, logging the data and calculations, visualization of the data and calculations for facilitating qualitative analysis, image analysis including one-dimensional, two-dimensional and three-dimensional visualizations, performing additional analyses as part of a remote monitoring and diagnostics service of the rotating component 802, etc.

One or more aspects of the operation of the overall processing architecture 800 including the computer system 820 can be controlled or adjusted by a user 812 via an external interface I/O component 826B and/or interaction with the host computer 845. The external interface I/O component 826B can include, for example, a touch screen that can selectively display user interface controls, such as control dials, which can enable the user 812 to adjust one or more settings or conditions associated with the computations such as, but not limited to, the parameters computed, the frequency of the computations, the reporting of the computations, the selection of analyses to be performed, etc. In an embodiment, the external interface I/O component 826B can conceivably include a keyboard, a plurality of buttons, a joystick-like control mechanism, and/or the like. The external interface I/O component 826B also can include any combination of various output devices (e.g., an LED, a visual display), which can be operated by the computer system 820 to provide status information such as results, analyses, etc., for use by the user 812.

The computer system 820 is shown including a processing component 822 (e.g., one or more processors), the storage component 824 (e.g., a storage hierarchy), an input/output (I/O) component 826A (e.g., one or more I/O interfaces and/or devices) to interact with the signal conditioner 806 and the host computer 845, and a communications pathway 828. In general, the processing component 822 executes program code, that can include the computation program 830 as well as other related programs, which are at least partially fixed in the storage component 824. While executing program code, the processing component 822 can process data, which can result in reading and/or writing transformed data 840 from/to the storage component 824 and/or the I/O component 826A for further processing. The pathway 828 provides a communications link between each of the components in the computer system 820.

The I/O component 826A and/or the external interface I/O component 826B can comprise one or more human I/O devices, which enable a human user 812 to interact with the computer system 820 and/or one or more communications devices to enable a system user 812 to communicate with the computer system 820 using any type of communications link. To this extent, during execution by the computer system 820, the computation program 830 and related programs can manage a set of interfaces (e.g., graphical user interface(s), application program interface, and/or the like) that enable human and/or system users 812 interaction. Furthermore, the computation program 830 and related programs can manage (e.g., store, retrieve, create, manipulate, organize, present, etc.) the data, such as data 840, using any solution.

The computer system 820 can comprise one or more general purpose computing articles of manufacture (e.g., computing devices) capable of executing program code, such as the computation program 830 and related programs, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the computation program 830 and related programs can be embodied as any combination of system software and/or application software.

Furthermore, the computation program 830 and related programs can be implemented using a set of modules 832. In this case, a module 832 can enable the computer system 820 to perform a set of tasks used by the computation program 830 and related programs, and can be separately developed and/or implemented apart from other portions of these programs. When the computer system 820 comprises multiple computing devices, each computing device can have only a portion of the computation program 830 and related programs fixed thereon (e.g., one or more modules 832). To this extent, in other embodiments, the functionality provided by the computer system 820 and the computation program 830 and related programs can be at least partially implemented by one or more computing devices that include any combination of general and/or specific purpose hardware with or without program code. In each embodiment, the hardware and program code, if included, can be created using standard engineering and programming techniques, respectively.

When the computer system 820 includes multiple computing devices, the computing devices can communicate over any type of communications link. Furthermore, while performing a process described herein, the computer system 820 can communicate with one or more other computer systems using any type of communications link. In either case, the communications link can comprise any combination of various types of wired and/or wireless links; any combination of one or more types of networks; and/or utilize any combination of various types of transmission techniques and protocols.

While shown and described herein as a system and method, it is understood that aspects of the present invention further provide various alternative embodiments. For example, in one embodiment, the various embodiments of the present invention can include a computer program fixed in at least one computer-readable medium, which when executed, enables a computer system to facilitate any of the aforementioned computations. To this extent, the computer-readable medium includes program code, such as the computation program 830, which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

In another embodiment, the present invention can provide a method of providing a copy of program code, such as the computation program 830, which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the present invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the various embodiments of the present invention can implement a method that facilitates any of the computations described herein. This can include configuring a computer system, such as the computer system 820, to implement a method for facilitating the computations. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system for measuring torque of a mechanical component, comprising:
   at least two bands affixed to the mechanical component;
   at least two sensing assemblies operatively coupled to each band, each sensing assembly configured to generate signals indicative of relative movement between a respective band and the sensing assembly;
   a signal conditioner to condition the signals; and
   a computing unit to determine a torque applied to the mechanical component based on the conditioned signals, wherein the computing unit is configured to determine the torque by:
      determining a radial displacement of the mechanical component with the bands based on strength and phase differences of the signals obtained by the respective sensing assemblies operatively coupled to the bands;
      determining an angular offset of the bands with the rotating component due to the radial displacement;
      determining an apparent angular phase difference between the bands based on differences in the signals generated from respective sensing assemblies;
      determining the amount of twist of the mechanical component that is present while the mechanical component is experiencing torque as a function of the apparent angular phase difference, the angular offset, and a predetermined angular phase difference between the bands obtained under a known torque condition; and
      correlating the amount of twist with the torque applied to the mechanical component.

2. The system according to claim 1, wherein each of the bands comprises an alternating pattern of segments of two materials along a perimeter of the bands, wherein the two materials comprise one of: ferrous metal and non-ferrous metal or north facing magnets and south facing magnets.

3. The system according to claim 1, further comprising a rigid structure that at least partially surrounds the mechanical component, wherein each of the sensing assemblies is fixedly secured to the rigid structure.

4. The system according to claim 1, wherein the signal conditioner comprises a plurality of signal conditioning and pre-processing channels, wherein each signal conditioning and pre-processing channel receives signals from a different one of the sensing assemblies.

5. The system according to claim 4, wherein each signal conditioning and pre-processing channel comprises an amplifier and a filter connected in series to amplify and filter the signals, and a feature events detector to identify feature events in the amplified and filtered signals.

6. The system according to claim 5, wherein the computing unit is configured to sample the amplified and filtered signal output from each signal conditioning and pre-processing channel and determine an average signal strength of the signal output from the channel, wherein each average signal strength is indicative of a measure of the average signal strength of the respective sensing assembly operatively coupled to the signal conditioning and pre-processing channel.

7. The system according to claim 5, wherein the computing unit is configured to record a feature events timestamp in response to receiving a feature events output from one of the signal conditioning and pre-processing channels.

8. The system according to claim 7, wherein the computing unit is configured to determine the radial displacement of the mechanical component with the bands as a function of the strength of the signals and the feature events timestamps received from the sensing assemblies associated with each of the bands.

9. The system according to claim 8, wherein the mechanical component is rotating, and wherein the computing unit is configured to determine the angular offset of the bands as a function of a time difference between the feature events from the sensing assemblies associated with each of the bands and a rotational speed of the mechanical component.

10. The system according to claim 7, wherein the computing unit is configured to ascertain an apparent difference in the feature events timestamps received from the sensing assemblies associated with each of the bands and compare the differences in the feature events timestamps from one band against the feature events timestamps of at least one other band, wherein the computing unit determines the apparent angular phase difference between the bands based on the differences in the feature events timestamps of the bands.

11. The system according to claim 1, further comprising a data acquisition unit operatively coupled to the computing unit, wherein the data acquisition unit is configured to monitor the torque and the twist determined by the computing unit and determine an effect that the torque and the twist has on the mechanical component.

12. A system for measuring torque of a rotating component, comprising:
  at least two bands affixed to the rotating component with a predetermining spacing separating the bands;
  at least two sensing assemblies operatively coupled to each band, each sensing assembly configured to generate signals that are indicative of a change in magnetic flux due to relative movement between a respective band and the sensing assembly;
  a signal conditioner with a pre-processing component to condition and pre-process the signals generated by the sensing assemblies;
  a computing unit to determine the torque applied to the rotating component based on the conditioned and pre-processed signals, wherein the computing unit is configured to determine the torque by:
    determining a radial displacement of an axis of rotation of the rotating component with the bands based on a strength and phase differences of the signals obtained by the respective sensing assemblies operatively coupled to the bands;
    determining an angular offset of the bands with the axis of rotation of the rotating component due to the radial displacement;
    determining an apparent angular phase difference between the bands based on differences in the signals generated from respective sensing coils assemblies;
    determining an amount of twist as a function of the apparent angular phase difference, the angular offset, and a predetermined angular phase difference between the magnetic bands obtained under a known torque condition; and
    correlating the amount of twist with the torque applied to the rotating component.

13. The system according to claim 12, wherein each of the bands comprises a plurality of magnetic segments each having a north pole and a south pole, wherein the north and south poles of the magnetic segments are arranged in an alternating north pole and south pole pattern.

14. The system according to claim 12, wherein the at least two sensing assemblies operatively coupled to each band are located about opposing sides of the rotating component facing the band.

15. The system according to claim 12, wherein the signal conditioner with the pre-processing component is configured to filter the signals and identify feature events in the filtered signals.

16. The system according to claim 12, wherein the computing unit comprises a plurality of interlocked computing sub-units each operatively coupled to the signal conditioner with pre-processing component, wherein each interlocked computing unit is configured to independently determine the torque applied to the rotating component based on the conditioned and pre-processed signals, and an output combiner unit operatively coupled to each of the interlocked computing sub-units, wherein the output combiner unit is configured to compare the torques determined from each of the interlocked computing sub-units.

17. The system according to claim 12, further comprising a digital signal processor that integrates the signal conditioner with pre-processing component with the computing unit, wherein the signal conditioner with pre-processing component includes a plurality of digital filters and a plurality of feature events detectors, wherein a serially connected digital filter and a feature events detector is operatively coupled each sensing coil assembly.

18. A system for measuring torque of a rotating component, comprising:
  at least two bands affixed to the rotating component;
  at least two sensing assemblies operatively coupled to each band, each sensing assembly configured to generate signals indicative of movement of a respective band operatively coupled to the sensing assembly;
  a signal conditioner to condition the signals, wherein the signal conditioner is configured to filter the signals, and identify feature events in the filtered signals; and
  a computing unit configured to determine the torque applied to the rotating component by:
    identifying feature events in the filtered signals associated with each sensing assembly;
    recording a feature event timestamp in response to the identification of each feature event;
    determining a radial displacement of the rotating component with the bands based on timing differences of the feature events identified for the respective sensing assemblies operatively coupled to the bands;
    determining an angular offset of the bands with the rotating component due to the radial displacement;
    determining an apparent angular phase difference between the bands based on differences in the signals generated from respective sensing assemblies;

determining the amount of twist as a function of the apparent angular phase difference, the angular offset, and a predetermined angular phase difference between the bands obtained under a known torque condition; and correlating the amount of twist with the torque applied to the rotating component.

19. The system according to claim 18, wherein the computing unit is configured to determine the angular offset of the bands as a function of a timing difference between the feature events from the sensing assemblies associated with each of the bands and a rotational speed of the rotating component.

20. The system according to claim 18, wherein the computing unit is configured to ascertain a difference in the feature event timestamps received from the sensing assemblies associated with each of the bands and compare the differences in the feature event timestamps from one band against the feature event timestamps of the other bands, wherein the computing unit determines the apparent angular phase difference between the bands based on the differences in the feature event timestamps of the bands.

\* \* \* \* \*